(12) United States Patent
Waugh et al.

(10) Patent No.: US 11,287,067 B2
(45) Date of Patent: Mar. 29, 2022

(54) FERRULE COUPLING FOR JOINING DUCTS TOGETHER

(71) Applicant: The Boeing Company, Chicago, IL (US)

(72) Inventors: Gregory M. Waugh, Roseburg, OR (US); Ronald Lawrence Clements, Kent, WA (US)

(73) Assignee: The Boeing Company, Chicago, IL (US)

( * ) Notice: Subject to any disclaimer, the term of this patent is extended or adjusted under 35 U.S.C. 154(b) by 695 days.

(21) Appl. No.: 16/020,402

(22) Filed: Jun. 27, 2018

(65) Prior Publication Data

US 2020/0003344 A1    Jan. 2, 2020

(51) Int. Cl.
*F16L 39/00* (2006.01)
*F16L 19/10* (2006.01)

(52) U.S. Cl.
CPC .................................. *F16L 19/10* (2013.01)

(58) Field of Classification Search
CPC .............................. F16L 39/00; F16L 39/005
USPC .................... 285/391, 123.3, 123.4, 123.9
See application file for complete search history.

(56) References Cited

U.S. PATENT DOCUMENTS

| | | | | |
|---|---|---|---|---|
| 1,130,497 A | * | 3/1915 | Dunham | A45D 40/00 132/314 |
| 1,442,371 A | * | 1/1923 | Tulloch | F16L 27/0849 285/181 |
| 2,152,962 A | * | 4/1939 | Ice | F16L 15/006 285/40 |
| 2,280,140 A | * | 4/1942 | Hart | B64D 37/005 137/68.11 |
| 3,497,243 A | | 2/1970 | Gruiller et al. | |
| 3,540,762 A | * | 11/1970 | Dunlap | F16L 37/105 285/391 |
| 3,948,545 A | * | 4/1976 | Bonds | E21B 17/085 285/4 |
| 3,971,576 A | * | 7/1976 | Herd | E21B 33/035 285/87 |
| 3,980,112 A | * | 9/1976 | Basham | B67D 7/54 141/392 |
| 3,998,479 A | * | 12/1976 | Bishop | E21B 17/04 285/123.3 |
| 4,295,787 A | | 10/1981 | Lardellier | |
| 4,488,740 A | * | 12/1984 | Baugh | E21B 33/043 285/84 |
| 4,600,334 A | | 7/1986 | Soussloff | |
| 4,754,782 A | * | 7/1988 | Grantham | F16L 39/005 138/109 |

(Continued)

FOREIGN PATENT DOCUMENTS

| | | |
|---|---|---|
| CN | 106322001 | 1/2017 |
| CN | 206918459 | 1/2018 |

(Continued)

*Primary Examiner* — David Bochna
(74) *Attorney, Agent, or Firm* — Haynes and Boone, LLP

(57) ABSTRACT

An apparatus comprising an inner ferrule and an outer ferrule. The inner ferrule comprises a plurality of engagement sections that define a plurality of gaps between the plurality of engagement sections. The outer ferrule is disposed around at least a portion of the inner ferrule. The outer ferrule comprises an engagement area mechanically joined to the plurality of engagement sections to join the inner ferrule to the outer ferrule.

25 Claims, 14 Drawing Sheets

(56) References Cited

U.S. PATENT DOCUMENTS

| | | | |
|---|---|---|---|
| 5,141,184 A | 8/1992 | Ziu | |
| 5,156,191 A * | 10/1992 | Walker | B67D 7/0488 |
| | | | 138/109 |
| RE34,332 E * | 8/1993 | Adams | F16L 7/00 |
| | | | 138/108 |
| 5,285,744 A * | 2/1994 | Grantham | B67D 7/0478 |
| | | | 138/113 |
| 5,400,828 A * | 3/1995 | Ziu | F16L 7/00 |
| | | | 138/111 |
| 5,497,809 A * | 3/1996 | Wolf | F16L 9/18 |
| | | | 138/113 |
| 5,624,140 A * | 4/1997 | Allen | B29C 66/81413 |
| | | | 285/123.1 |
| 6,464,261 B1 * | 10/2002 | Dybevik | E21B 17/042 |
| | | | 285/123.15 |
| 7,152,700 B2 * | 12/2006 | Church | E21B 7/068 |
| | | | 175/320 |
| 7,431,351 B2 * | 10/2008 | Russell | F16L 15/08 |
| | | | 285/381.1 |
| 10,577,871 B2 * | 3/2020 | Cherkaoui | F16L 59/065 |
| 2004/0026922 A1 * | 2/2004 | Carns | F16L 25/01 |
| | | | 285/123.15 |
| 2004/0207202 A1 * | 10/2004 | Parks | F16L 37/105 |
| | | | 285/391 |
| 2009/0102187 A1 | 4/2009 | Carns et al. | |
| 2014/0161515 A1 | 6/2014 | Heston et al. | |
| 2015/0130183 A1 | 5/2015 | Statler et al. | |

FOREIGN PATENT DOCUMENTS

| | | |
|---|---|---|
| EP | 3418618 | 12/2018 |
| KR | 101029111 | 4/2011 |
| WO | WO 2019/202386 | 10/2019 |

* cited by examiner

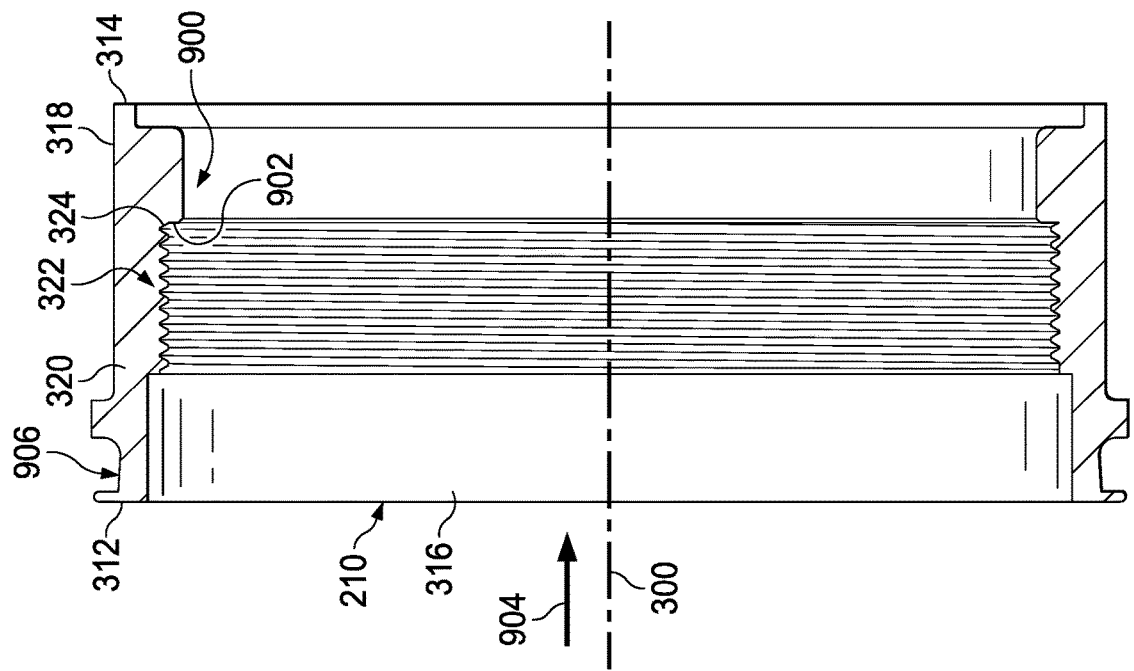
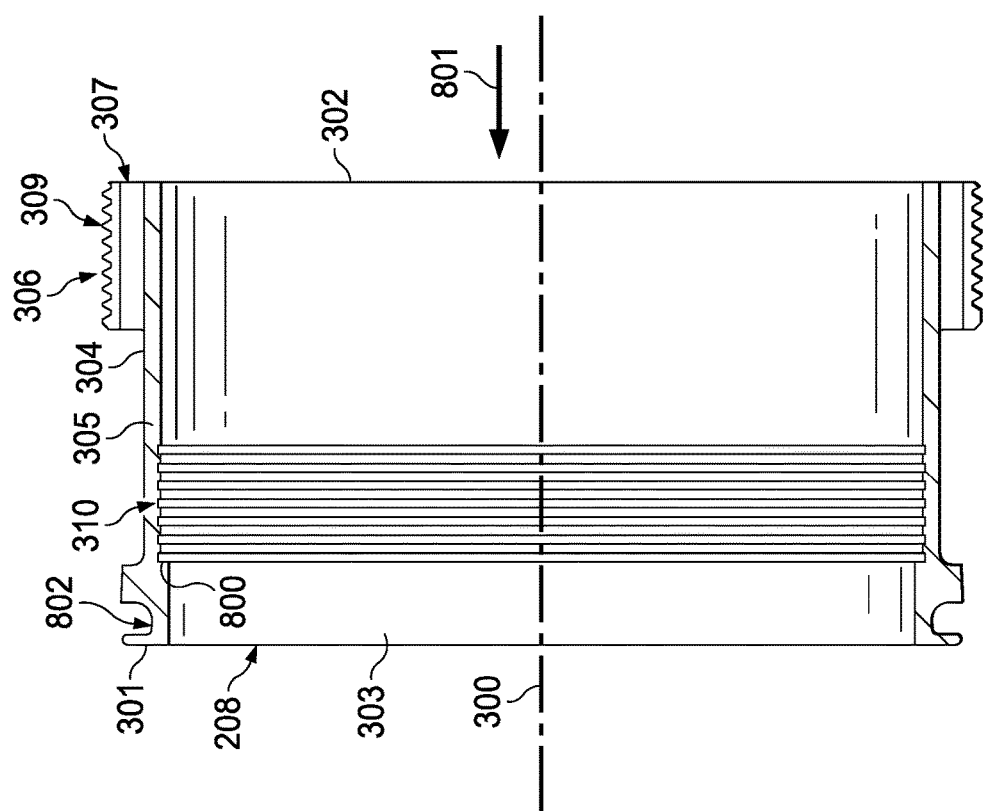

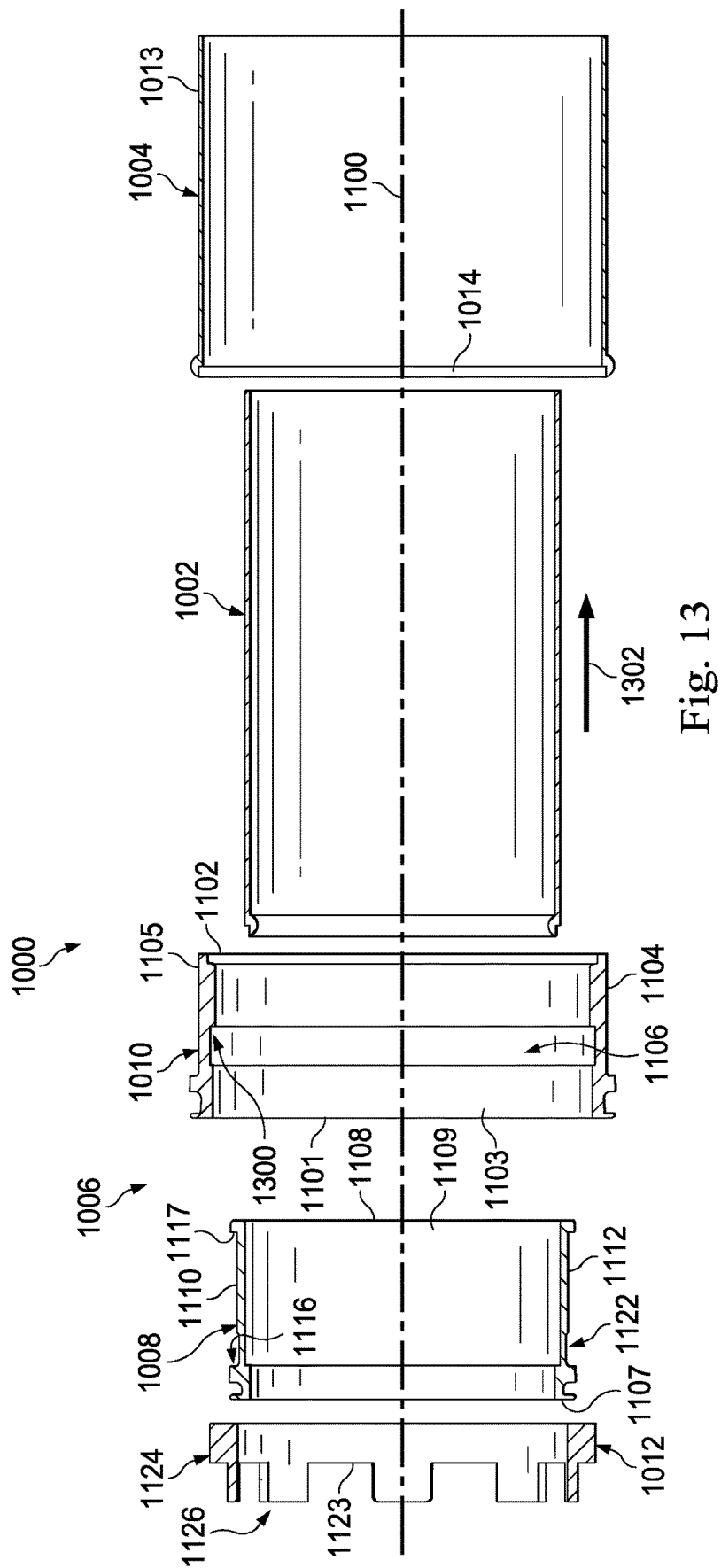

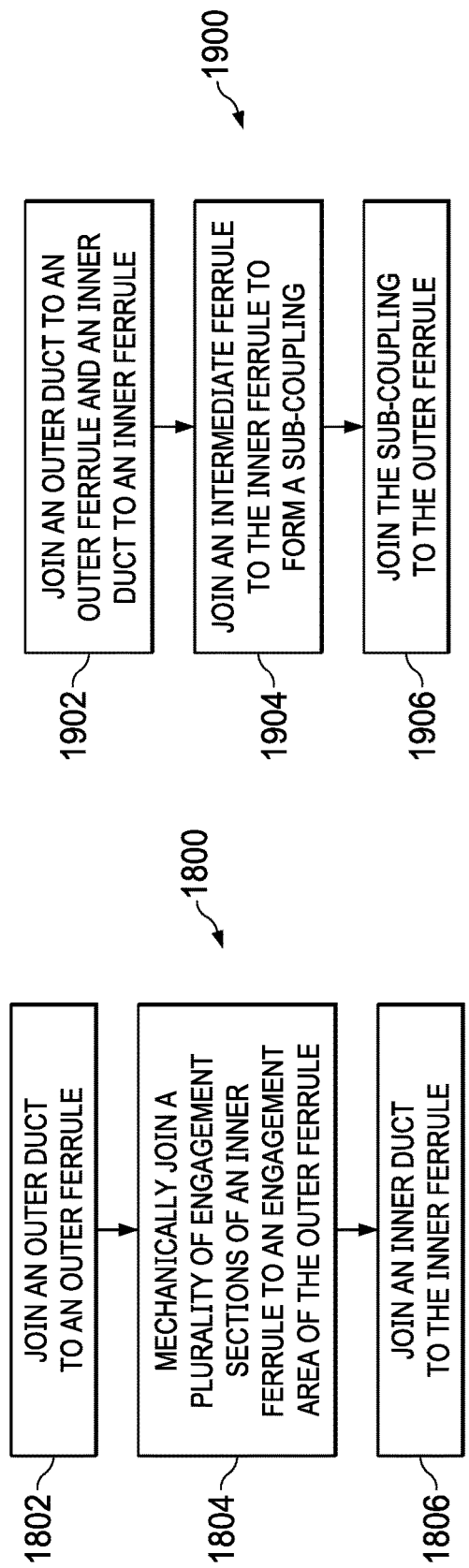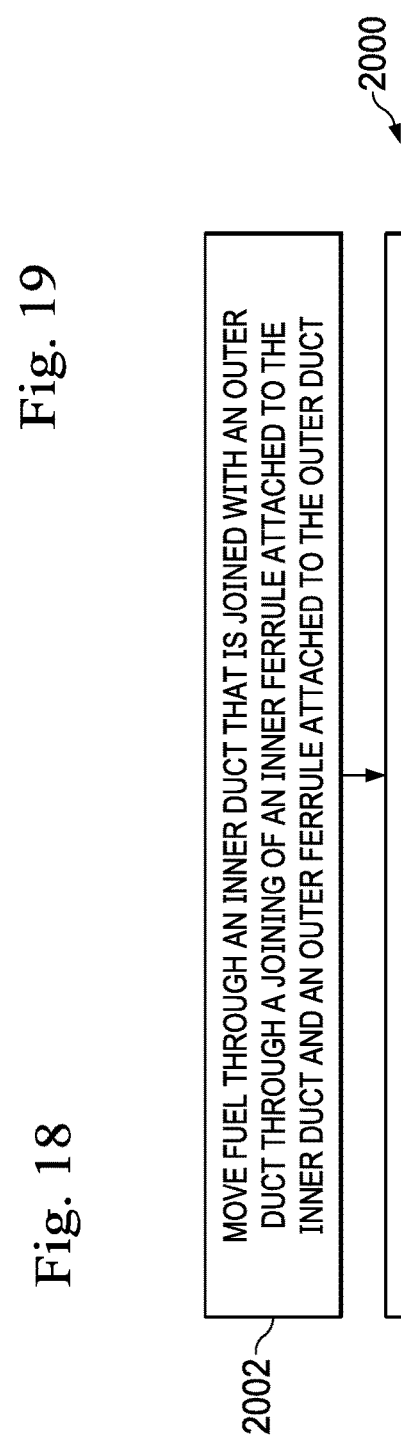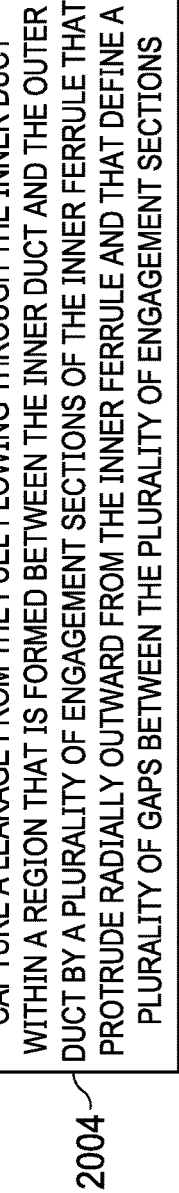

FERRULE COUPLING FOR JOINING DUCTS TOGETHER

FIELD

The present disclosure relates generally to a ferrule coupling for joining together lines, such as ducts, and, more particularly, to an apparatus and method for joining an outer duct and an inner duct using a ferrule coupling assembled using two ferrules or three ferrules.

BACKGROUND

Certain applications may require the use of lines, pipes, or ducts with multiple walls. As one example, an aircraft may have fuel lines formed by dual wall duct systems. For example, a fuel line may include an inner duct and an outer duct that are joined to each other with the outer duct spaced apart from the inner duct. In some cases, the inner duct may be used for a fluid of a first type, while the outer duct may be used for a fluid of a second type. In other cases, the inner duct may be used for a main flow of fluid, while the outer duct may be used to contain leakage or vapors released from the inner duct. A coupling may be used to both join the inner duct and the outer duct and control a distance between the inner duct and the outer duct. For example, a coupling may be used to ensure that the outer duct is spaced apart from the inner duct to allow a flow of fluid or provide a containment volume between the inner duct and the outer duct.

Some currently available couplings for joining an inner duct and an outer duct use two ferrules that are welded together at one or more weld locations. Over time, the performance of the coupling at these one or more weld locations may decline due to temperature changes, stress, or other factors. For example, the coupling may become susceptible to cracking or separation at the one or more weld locations. Further, welding the two ferrules together makes welding or other permanent methods of joining the ferrules to prevent for disassembly of the components once joined. Thus, one or more apparatuses and methods for ferrule couplings unaffected by heat-based stresses may be desired.

SUMMARY

In one example embodiment, an apparatus comprises an inner ferrule and an outer ferrule. The inner ferrule has a plurality of engagement sections that define a plurality of gaps between the plurality of engagement sections. The outer ferrule has an engagement area disposed around at least a portion of the inner ferrule and mechanically joined to the plurality of engagement sections to join the inner ferrule to the outer ferrule.

In another example embodiment, another apparatus is provided. The apparatus comprises an inner ferrule, an intermediate ferrule, and an outer ferrule. The intermediate ferrule includes a plurality of engagement sections. The intermediate ferrule is disposed around at least a portion of the inner ferrule and is mechanically joined to the inner ferrule. The outer ferrule includes an engagement area disposed around at least a portion of the intermediate ferrule. The engagement area is mechanically joined to the plurality of engagement sections.

In yet another example embodiment, a method is provided. The method may include coupling an outer duct to an outer ferrule. A plurality of engagement sections of an inner ferrule is joined to an engagement area of the outer ferrule. Further, an inner duct is joined to the inner ferrule. The outer ferrule may be disposed around the inner ferrule.

In still yet another example embodiment, a method is provided for moving fuel through a duct system in an aircraft. The fuel is moved through an inner duct that is joined with an outer duct through a joining of an inner ferrule attached to the inner duct and an outer ferrule attached to the outer duct. A leakage from the fuel flowing through the inner duct is captured within a region that is formed between the inner duct and the outer duct by a plurality of engagement sections of the inner ferrule that protrude radially outward from the inner ferrule and that define a plurality of gaps between the plurality of engagement sections.

The features and functions may be achieved independently in various embodiments of the present disclosure or may be combined in yet other embodiments in which further details may be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, and further objectives and features thereof, will best be understood by reference to the following detailed description of an illustrative embodiment of the present disclosure when read in conjunction with the accompanying drawings, wherein:

FIG. 8 is an illustration of a cross-sectional view of an inner ferrule in accordance with an example embodiment.

FIG. 9 is an illustration of a cross-sectional view of an outer ferrule in accordance with an example embodiment.

FIG. 13 is an illustration of a side exploded view of the duct system from FIG. 12 in accordance with an example embodiment.

FIG. 18 is a flowchart illustration of a process for assembling a duct system in accordance with an example embodiment.

FIG. 19 is a flowchart illustration of a process for assembling a duct system in accordance with an example embodiment.

FIG. 20 is a flowchart illustration of a process for moving fuel through a duct system in an aircraft in accordance with an example embodiment.

DETAILED DESCRIPTION

The illustrative examples provide a duct system that uses a ferrule coupling formed using multiple ferrules. This multi-piece ferrule coupling may be used to connect an inner duct and an outer duct to form a duct system in which the outer duct is spaced apart from the inner duct. The outer duct may form an encapsulated shroud around the inner duct. The ferrule coupling described in the illustrative examples may be formed using at least two ferrule components that are assembled to form the ferrule coupling without welding. The ferrule coupling forms an electrostatic bond path between the inner duct and the outer duct. This type of ferrule coupling may be robust and may reduce or eliminate the need for rework of each ferrule component, thereby allowing the electrostatic bond path to be maintained. Further, this multi-piece ferrule coupling may have a longer service life than a ferrule coupling formed by welding two ferrules together.

Figure 1:
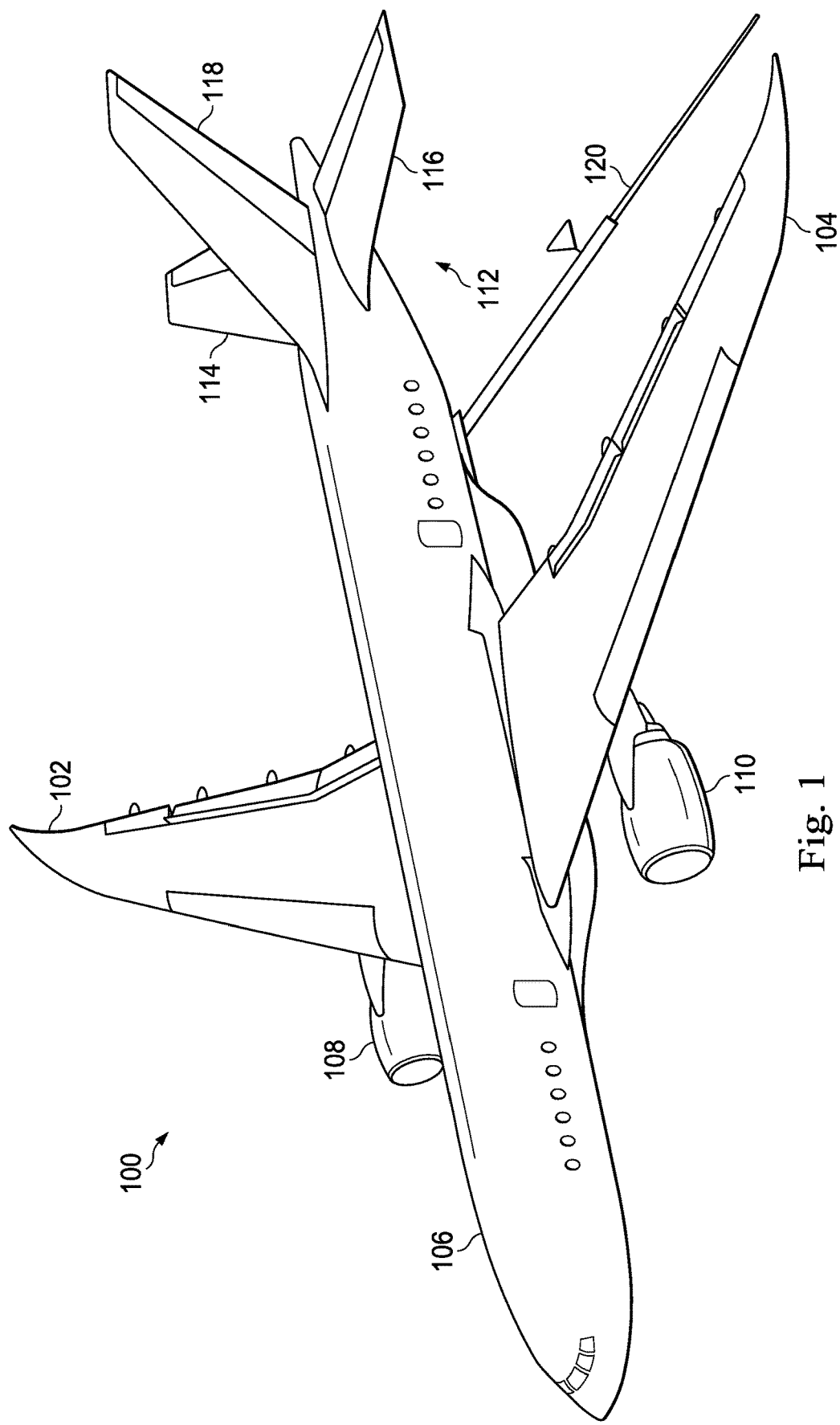
FIG. 1 is an illustration of a perspective view of an aircraft in accordance with an example embodiment.

With reference now to the figures, FIG. 1 is an illustration of an aircraft, depicted in accordance with an illustrative embodiment. Aircraft 100 includes wing 102 and wing 104 attached to fuselage 106. Aircraft 100 includes engine 108 attached to wing 102 and engine 110 attached to wing 104. Aircraft 100 also includes tail section 112. Horizontal stabilizer 114, horizontal stabilizer 116, and vertical stabilizer 118 are attached to tail section 112.

Aircraft 100 is an example of one type of platform that includes duct systems that include multi-piece ferrule couplings in accordance with the illustrative embodiments described below. For example, without limitation, aircraft 100 may include a fuel system that includes fuel lines that at least partially include duct systems joined together with multi-piece ferrule couplings in a manner similar to duct system 200 of FIG. 2 below or duct system 1000 of FIG. 10 below.

In these illustrative examples, aircraft 100 takes the form of a refueling aircraft, such as a tanker, having refueling boom 120. Fuel may be transferred from aircraft 100 to another aircraft or other type of vehicle or platform through refueling boom 120. A duct system, such as duct system 200 in FIG. 2 or duct system 1000 in FIG. 10 below, may be used with fuel lines that are located within the refueling aircraft or outside the refueling aircraft. For example, these types of duct systems may be used with fuel lines that are connected to or located within refueling boom 120.

Figure 2:
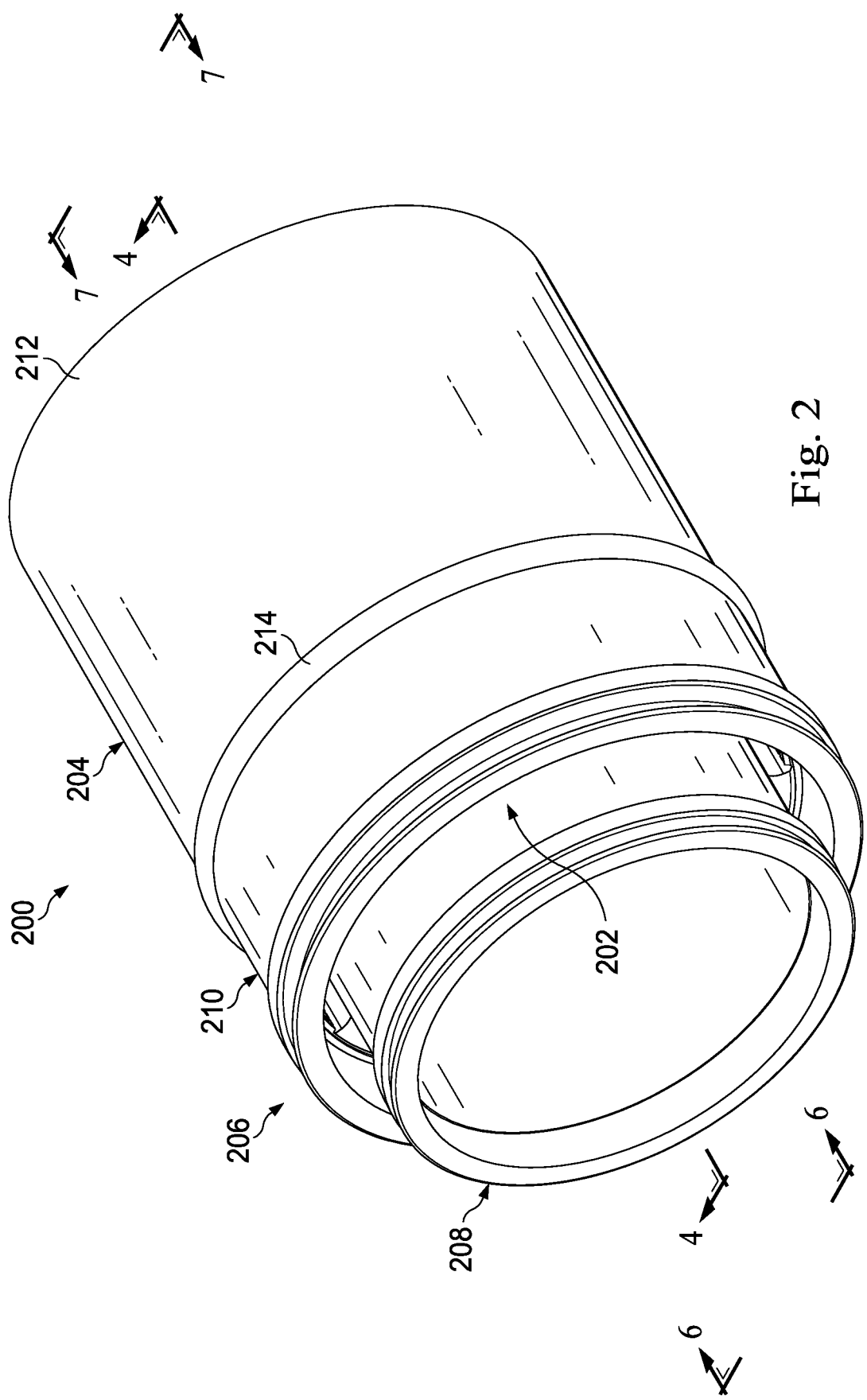
FIG. 2 is an illustration of an isometric view of a duct system formed using a ferrule coupling in accordance with an example embodiment.

In other illustrative examples, aircraft 100 may be some other type of aircraft and one or more duct systems implemented similar to duct system 200 of FIG. 2 may be used to transport fuel or other fluids or gases within an inner duct.

The outer duct may then serve to lock in any fluids or gases that leak from the inner duct. As such, an inner duct may be disposed within an outer duct, ferrules may be used to join together the inner duct and the outer duct and dispose the outer duct in a fixed spatial relationship to the outer duct.

Such ferrules may include a multi-piece ferrule coupling with two, three, or four or more ferrule components. As the components of such a multi-piece ferrule coupling may be mechanically joined together, electrostatic bonding is not needed to join together the components. In this way, areas of the ferrules weakened from heat-based stresses of electrostatic bonding may be prevented. For the purposes of this disclosure, "joining" may refer to one or both of direct coupling (e.g., two components that are directly connected and, thus, contacting one another) or indirect coupling (e.g., two components that are held in one or more fixed spatial relations to each other through one or more other components). Thus, "join" or "joining" may also be referred to as "couple" or "coupling," herein.

A technical effect of the illustrative embodiments described herein includes reduced maintenance of fuel lines. For example, the multi-piece ferrule couplings may reduce or eliminate the need for rework of each ferrule component. Further, the duct systems using these types of ferrule couplings may be stronger and more reliable over time because the ferrule couplings include at least one interface between the multiple ferrules of the multi-piece ferrule coupling that is stronger and more resistant to temperature-based stresses, cracking, and/or other inconsistencies as compared to ferrule couplings in which all ferrule interfaces are formed by welding.

Thus, a technical effect of the illustrative embodiments described herein includes duct systems that are more reliable compared to traditionally manufactured ducts, such as ducts with welded ferrules. Further, even after rework, the ferrule couplings described by the illustrative embodiments herein do not weaken or eliminate an electrostatic bond path between the inner and outer ducts of the duct system. Accordingly, these ferrule couplings, and thereby the duct systems using these types of ferrule couplings, may have longer service lives.

FIGS. 2-9 are illustrations of different views of duct system 200 and components of duct system 200. Duct system 200 is a multi-walled duct system that uses a dual ferrule coupling.

With reference now to FIG. 2 is an illustration of an isometric view of a duct system formed using a ferrule coupling in accordance with an example embodiment. Duct system 200 may include at least two ducts and may include any number of ferrules, ferrule couplings, or combination thereof. In one illustrative embodiment, duct system 200 includes inner duct 202, outer duct 204, and ferrule coupling 206. Ferrule coupling 206 is used to mechanically join inner duct 202 and outer duct 204.

Ferrule coupling 206 includes inner ferrule 208 and outer ferrule 210. Inner ferrule 208 is joined to inner duct 202. When inner ferrule 208 is joined to inner duct 202, inner ferrule 208 may be disposed around, or overlap, at least a portion of an exterior (not shown) of inner duct 202. Outer ferrule 210 is joined to outer duct 204. When outer ferrule 210 is joined to outer duct 204, outer ferrule 210 may be adjacent to, surround, or overlap at least a portion of exterior 212 of outer duct 204.

The joining of inner ferrule 208 to inner duct 202 and outer ferrule 210 to outer duct 204 may be performed using any number of techniques including, but not limited to, at least one of welding, electrostatic bonding, adhesive bonding, swaging, or some other type of process. For example, inner duct 202 may be swaged within inner ferrule 208. In some illustrative examples, outer ferrule 210 is welded to outer duct 204 at weld interface 214. Weld interface 214 may be formed using, for example, a butt welding technique. For example, weld interface 214 may be formed where an edge of outer ferrule 210 abuts an edge of outer duct 204.

Inner ferrule 208 may be joined with outer ferrule 210 to thereby join inner duct 202 with outer duct 204. As depicted, when inner ferrule 208 and outer ferrule 210 are joined, outer ferrule 210 may at least partially overlap inner ferrule 208.

In these illustrative examples, inner ferrule 208 may be mechanically joined with outer ferrule 210. A first component, such as inner ferrule 208, may be "mechanically joined" to a second component, such as outer ferrule 210, either directly or indirectly. Further, mechanically coupling two components may mean coupling the two components, without welding. In some cases, mechanically joining two components creates an electrostatic bond between the two components. Inner ferrule 208 may be mechanically joined to outer ferrule 210 via threading, friction fit, swaging, bolting, insertion of at least one dowel in a corresponding opening, adhesive, some other mechanical coupling technique, or a combination thereof.

Figure 3:
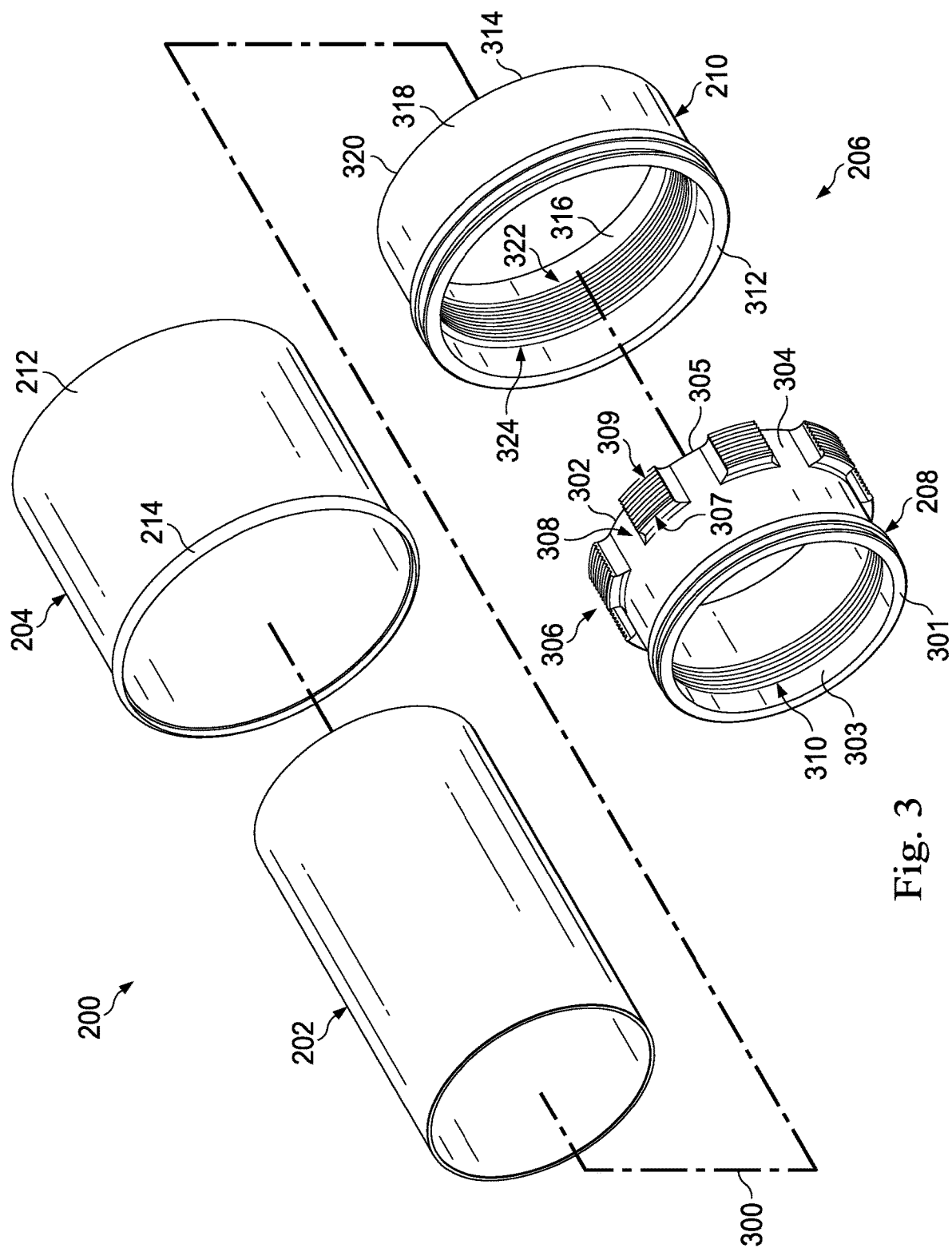
FIG. 3 is an illustration of an isometric exploded view of the duct system from FIG. 2 in accordance with an example embodiment.

FIG. 3 is an illustration of an isometric exploded view of duct system 200 from FIG. 2 in accordance with an example embodiment. As depicted, inner duct 202, outer duct 204, inner ferrule 208, and outer ferrule 210 may be substantially cylindrical. Further, when assembled to form duct system 200, inner duct 202, outer duct 204, inner ferrule 208, and outer ferrule 210 may be substantially coaxial with respect to axis 300.

Inner ferrule 208 extends between end 301 and end 302. As depicted, inner ferrule 208 has inner surface 303 and outer surface 304. Inner ferrule 208 includes body 305 and plurality of engagement sections 306 disposed along outer surface 304. In these illustrative examples, plurality of engagement sections 306 may be a plurality of discrete, discontinuous engagement sections disposed substantially circumferentially around body 305 of inner ferrule 208 at or near end 302 of inner ferrule 208. In particular, each of plurality of engagement sections 306 may be located at a different position along outer surface 304 of body 305 of inner ferrule 208.

In these illustrative examples, plurality of engagement sections 306 may protrude or extend radially outwards from body 305 relative to axis 300. Engagement section 307 is an example of one of plurality of engagement sections 306. Engagement section 307 has a selected height such that engagement section 307 protrudes outward.

Plurality of engagement sections 306 defines plurality of gaps 308 between plurality of engagement sections 306. When inner ferrule 208 is joined to outer ferrule 210, plurality of gaps 308 helps define openings through which fluid may flow. Further, each of plurality of engagement sections 306 has threads. For example, engagement section 307 has threads 309.

In one illustrative example, inner ferrule 208 includes grooves 310 disposed on inner surface 303 of body 305 of inner ferrule 208. Grooves 310 are disposed along inner surface 303 between end 301 and end 302. In this illustrative example, grooves 310 are disposed along a middle portion of inner surface 303 located between end 301 and end 302 of inner ferrule 208. As depicted, grooves 310 may extend fully around inner surface 303 of body 305 of inner ferrule 208. In some illustrative examples, grooves 310 may extend only partially around inner surface 303. In other illustrative examples, without limitation, grooves 310 may extend in a discontinuous manner around inner surface 303 to form multiple grooved areas along inner surface 303.

Inner duct 202 may be fit at least partially within inner ferrule 208 using grooves 310. For example, without limitation, grooves 310 may take the form of swage grooves. Inner duct 202 may be swaged (e.g., roller swaged) within inner ferrule 208 using grooves 310 (e.g., swage grooves) to form a swaged joint between inner ferrule 208 and inner duct 202.

Outer ferrule 210 extends between end 312 and end 314. As depicted, outer ferrule 210 has inner surface 316 and outer surface 318. Outer ferrule 210 includes body 320 and engagement area 322. Engagement area 322 of outer ferrule 210 may be a substantially continuous area, or feature, disposed along inner surface 316 of body 320 of outer ferrule 210. In this illustrative example, engagement area 322 is located along a middle portion of inner surface 316 between end 312 and end 314. In these illustrative examples, engagement area 322 may extend fully around inner surface 316 of body 320 in an annular manner. In other illustrative examples, engagement area 322 may be disposed only partially around inner surface 316 or may be formed in a discontinuous manner around inner surface 316.

Plurality of engagement sections 306 of inner ferrule 208 may be engaged with engagement area 322 to join inner ferrule 208 to outer ferrule 210. In other words, engagement area 322 may be mechanically joined to plurality of engagement sections 306 to join inner ferrule 208 to outer ferrule 210.

Engagement area 322 may include threads 324 disposed along inner surface 316 of outer ferrule 210. In these illustrative examples, the threads on each of plurality of engagement sections 306 may be sized and shaped for engagement with threads 324 of engagement area 322 of outer ferrule 210. In other words, threads 324 may correspond with the threads of plurality of engagement sections 306. For example, threads 309 of engagement section 307 may be sized and shaped for engagement with threads 324. In other words, threads 309 may correspond to threads 324.

In these illustrative examples, inner duct 202, outer duct 204, inner ferrule 208, and outer ferrule 210 may each be comprised of one or more materials including, but not limited to, metal and metal alloys. Body 305 of inner ferrule 208 may be comprised of a material that is harder than the material forming inner duct 202 to allow for swaging. In some cases, body 305 of inner ferrule 208 may also be comprised of a material that is harder than the material forming body 320 of outer ferrule 210. For example, without limitation, body 305 of inner ferrule 208 may be comprised of a first aluminum alloy, such as 2024-T851 aluminum, while body 320 of outer ferrule 210 may be comprised of a second aluminum alloy, such as 6061-T6 aluminum.

Figure 4:
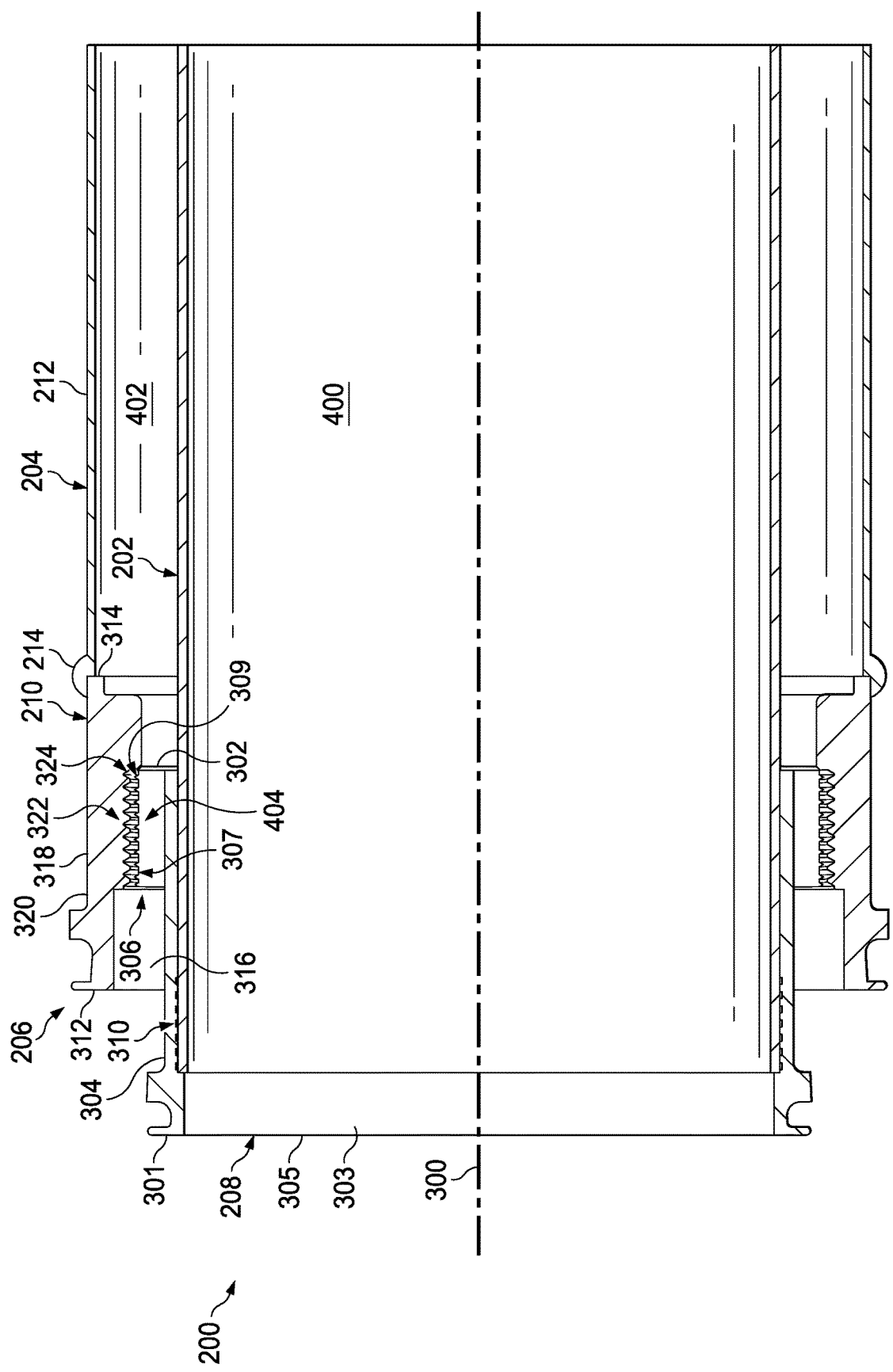
FIG. 4 is an illustration of a cross-sectional view of the duct system from FIG. 2 in accordance with an example embodiment.

FIG. 4 is an illustration of a cross-sectional view of duct system 200 taken with respect to lines 4-4 in FIG. 2 in accordance with an example embodiment. As depicted, inner ferrule 208 engages outer ferrule 210 to thereby join inner duct 202 with outer duct 204. A fluid (e.g., a liquid(s), a gas(es), or combination thereof) may flow through channel 400 through inner duct 202. In these illustrative examples, at least one of inner ferrule 208 or inner duct 202 defines an outer circumference of channel 400, which may be a first fluid volume.

In this illustrative example, inner duct 202 has been swaged within inner ferrule 208. Further, threads 309 of engagement section 307 of inner ferrule 208 are engaged with threads 324 of engagement area 322 of outer ferrule 210. Further, weld interface 214 between outer ferrule 210 and outer duct 204 may be more clearly seen.

Ferrule coupling 206 formed by inner ferrule 208 and outer ferrule 210 provides separation between inner duct 202 and outer duct 204. In particular, ferrule coupling 206 spaces apart outer duct 204 from inner duct 202 to define region 402 between inner duct 202 and outer duct 204. Specifically, at least one of outer ferrule 210 or outer duct 204 defines an outer circumference of region 402, which may be a second fluid volume.

Outer duct 204 may be separated from inner duct 202 in a radial direction relative to axis 300. Region 402 may be used to collect any leakage of fluid flowing through channel 400 within inner duct 202. When the fluid flowing through inner duct 202 is fuel, region 402 may be used to capture a leakage of the fuel or a leakage of fuel vapors. For example, outer duct 204 may function as a "shroud" that prevents any leakage of fluid out of inner duct 202 from escaping duct system 200. In other illustrative examples, region 402 may provide for the flow of a fluid different from the fluid flowing through channel 400 in a same or different direction.

In still other illustrative examples, channel 400 may be used for transferring fluid and filling, while region 402 may be used for venting. As one illustrative example, when duct system 200 is used within, for example, refueling boom 120 of FIG. 1, region 402 may be used to provide venting. When fuel is transferred through refueling boom 120 into, for example, a fuel tank of another aircraft, vapors in the fuel tank may be pushed out as fuel fills the fuel tank. These vapors may be vented out of the fuel tank through region 402 between inner duct 202 and outer duct 204.

The engagement of threads on plurality of engagement sections 306 from FIG. 3 with threads 324 of engagement area 322 establishes ferrule interface 404 between inner ferrule 208 and outer ferrule 210. Ferrule interface 404 establishes an electrostatic bond between inner ferrule 208 and outer ferrule 210, and thereby, between inner duct 202 and outer duct 204. Ferrule interface 404 may be stronger and more resistant to temperature-based stresses, cracking, and/or other inconsistencies as compared to an interface formed by welding. Further, ferrule interface 404, even if reworked later in the life of duct system 200, may be capable of maintaining the electrostatic bond between inner ferrule 208 and outer ferrule 210 and thereby, between inner duct 202 and outer duct 204.

Figure 5:
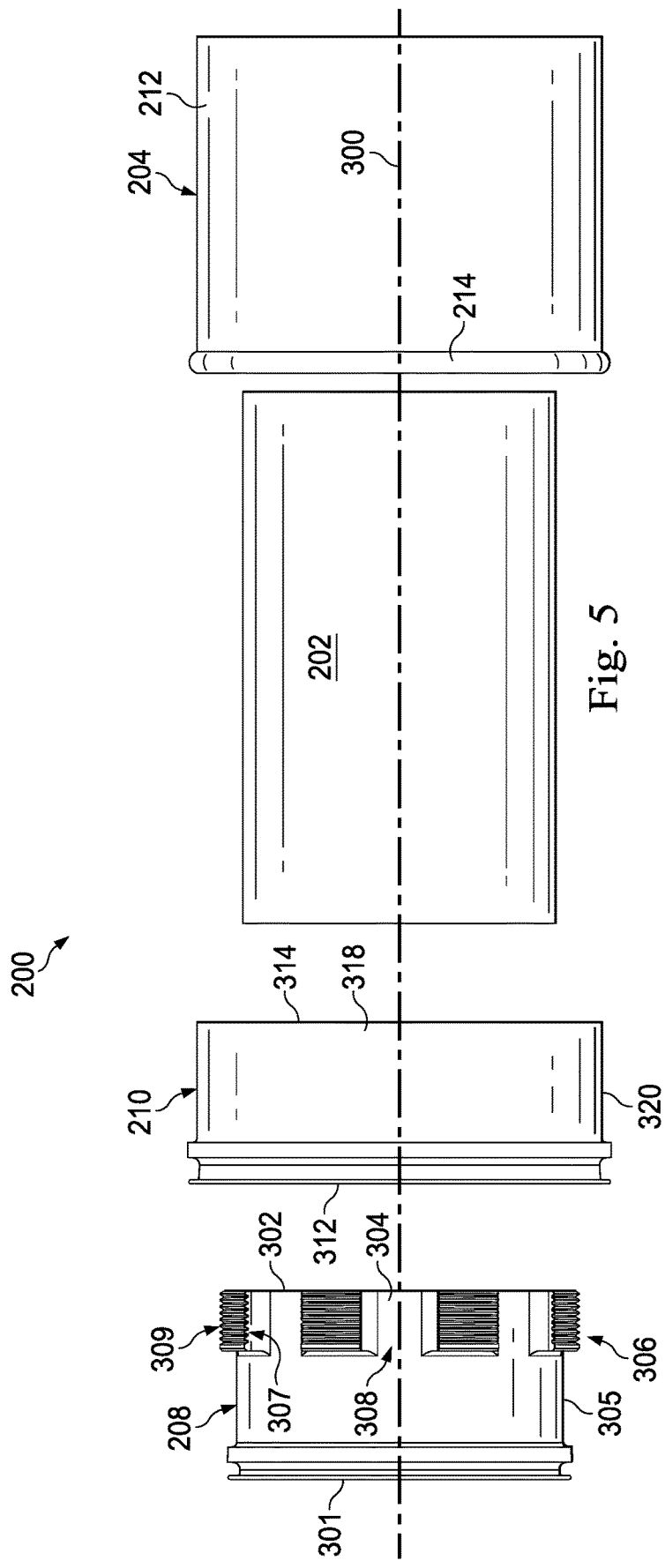
FIG. 5 is an illustration of a side exploded view of the duct system from FIG. 4 in accordance with an example embodiment.

FIG. 5 is an illustration of a side exploded view of duct system 200 from FIG. 4 in accordance with an example embodiment. As depicted, each engagement section of plurality of engagement sections 306 is individually threaded. Thus, coupling inner ferrule 208 to outer ferrule 210 may include threading together inner ferrule 208 and outer ferrule 210 such that the threads on each of plurality of engagement sections 306 engage the corresponding threads 324 of engagement area 322 of outer ferrule 210.

Figure 6:
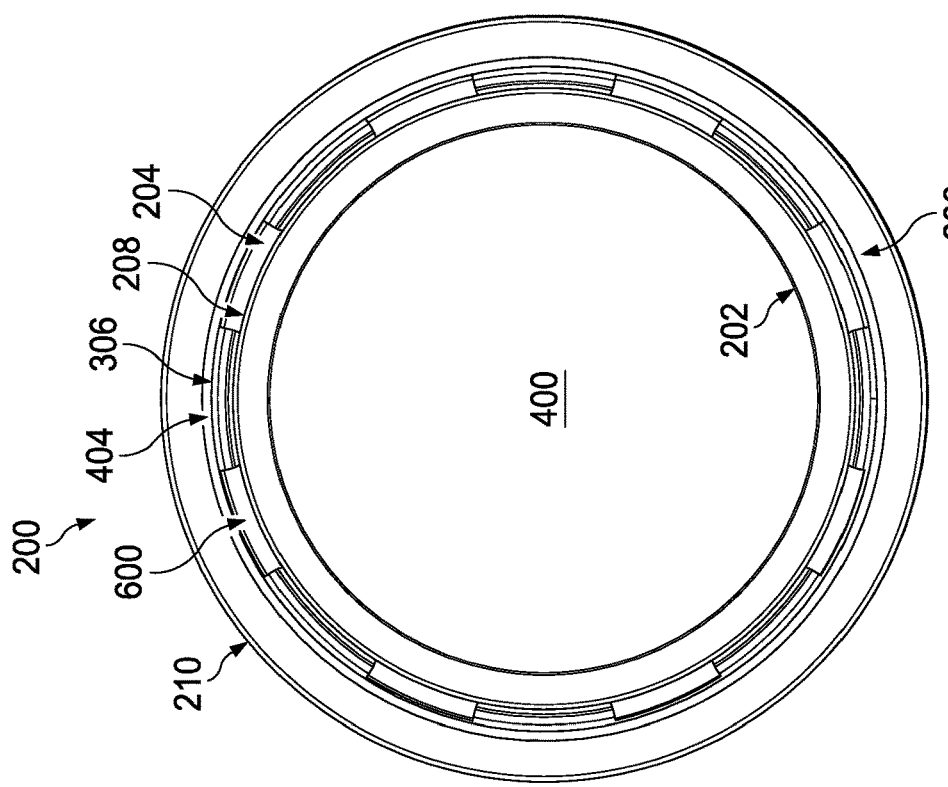
FIG. 6 is an illustration of a front view of the duct system from FIG. 2 in accordance with an example embodiment.

FIG. 6 is an illustration of a front view of duct system 200 taken with respect to lines 6-6 in FIG. 2 in accordance with an example embodiment. As depicted, plurality of gaps 308 between plurality of engagement sections 306 help define plurality of openings 600 through which fluid may flow. Plurality of openings 600 allow fluid to flow into or out of region 402. For example, plurality of openings 600 may allow fluid to flow in a substantially axial direction relative to axis 300.

Figure 7:
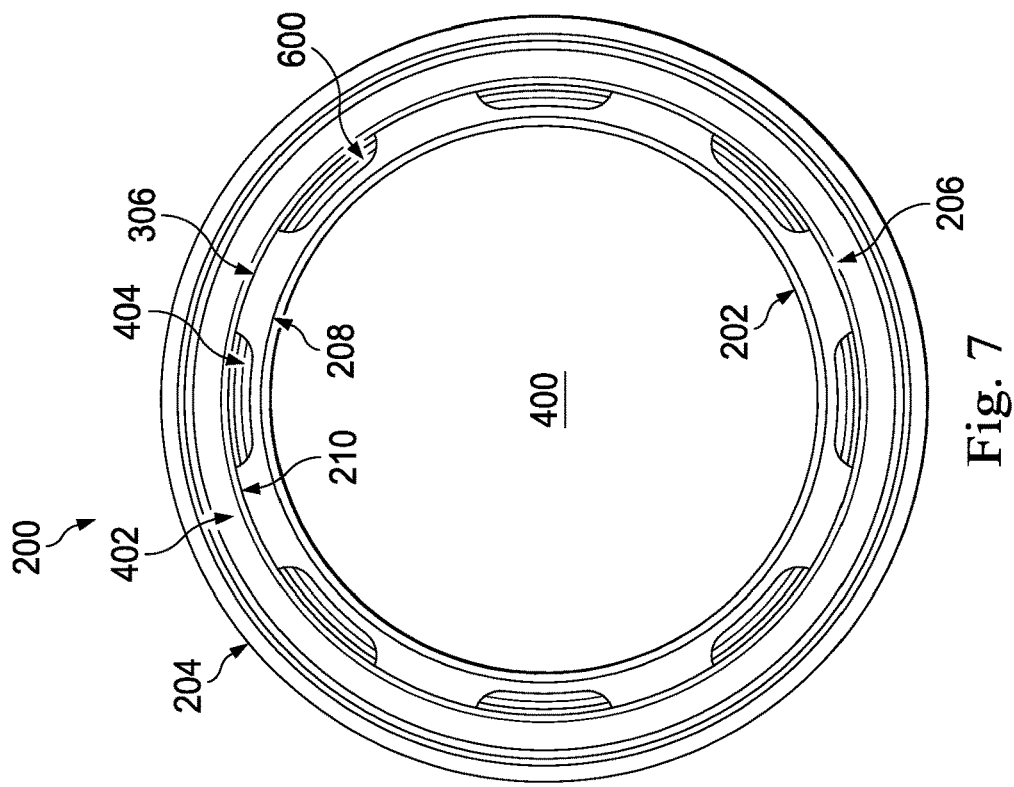
FIG. 7 is an illustration of a rear view of the duct system from FIG. 2 in accordance with an example embodiment.

FIG. 7 is an illustration of a rear view of duct system 200 from FIGS. 2-6 taken with respect to lines 7-7 in FIG. 2 in accordance with an example embodiment. Plurality of openings 600 may also be visible in this view.

FIG. 8 is an illustration of a cross-sectional view, similar to that of FIG. 4, of only inner ferrule 208 in accordance with an example embodiment. Threads 309 of engagement section 307 may be more clearly depicted in this view. Further, grooves 310 may be more clearly depicted. Inner ferrule 208 has stop feature 800 located adjacent to grooves 310. Stop feature 800 helps provide a guide for the positioning of inner duct 202 of FIGS. 2-3 within inner ferrule 208. When inner duct 202 is swaged within inner ferrule 208 in the direction of arrow 801, stop feature 800 provides a stop for this swaging action to help prevent further swaging in the direction of arrow 801.

Inner ferrule 208 also includes outer groove 802. Outer groove 802 may be used during the manufacturing of inner ferrule 208 (e.g., as a data point reference), may receive a sealing component, such as an O-ring, may be interfaced with one or more other components (e.g., may be used to join inner ferrule 208 to a different ferrule), or a combination thereof.

FIG. 9 is an illustration of a cross-sectional view, similar to that of FIG. 4, of only outer ferrule 210 in accordance with an example embodiment. Threads 324 of engagement area 322 may be more clearly depicted in this view. As depicted, outer ferrule 210 may include portion 900 having a smaller diameter than the rest of outer ferrule 210. Portion 900 defines stop feature 902. Stop feature 902 helps provide a guide for the positioning of inner ferrule 208 of FIGS. 2-3 within outer ferrule 210. When inner ferrule 208 is threaded into outer ferrule 210 in the direction of arrow 904, stop feature 902 provides a stop for this threading action to prevent further threading in the direction of arrow 904.

Further, outer ferrule 210 includes outer groove 906. Outer groove 906 may be used during the manufacturing of outer ferrule 210 (e.g., as a data point reference), may receive a sealing component, such as an O-ring, may be interfaced with one or more other components (e.g., may be used to join outer ferrule 210 to a different ferrule), or a combination thereof.

Figure 10:
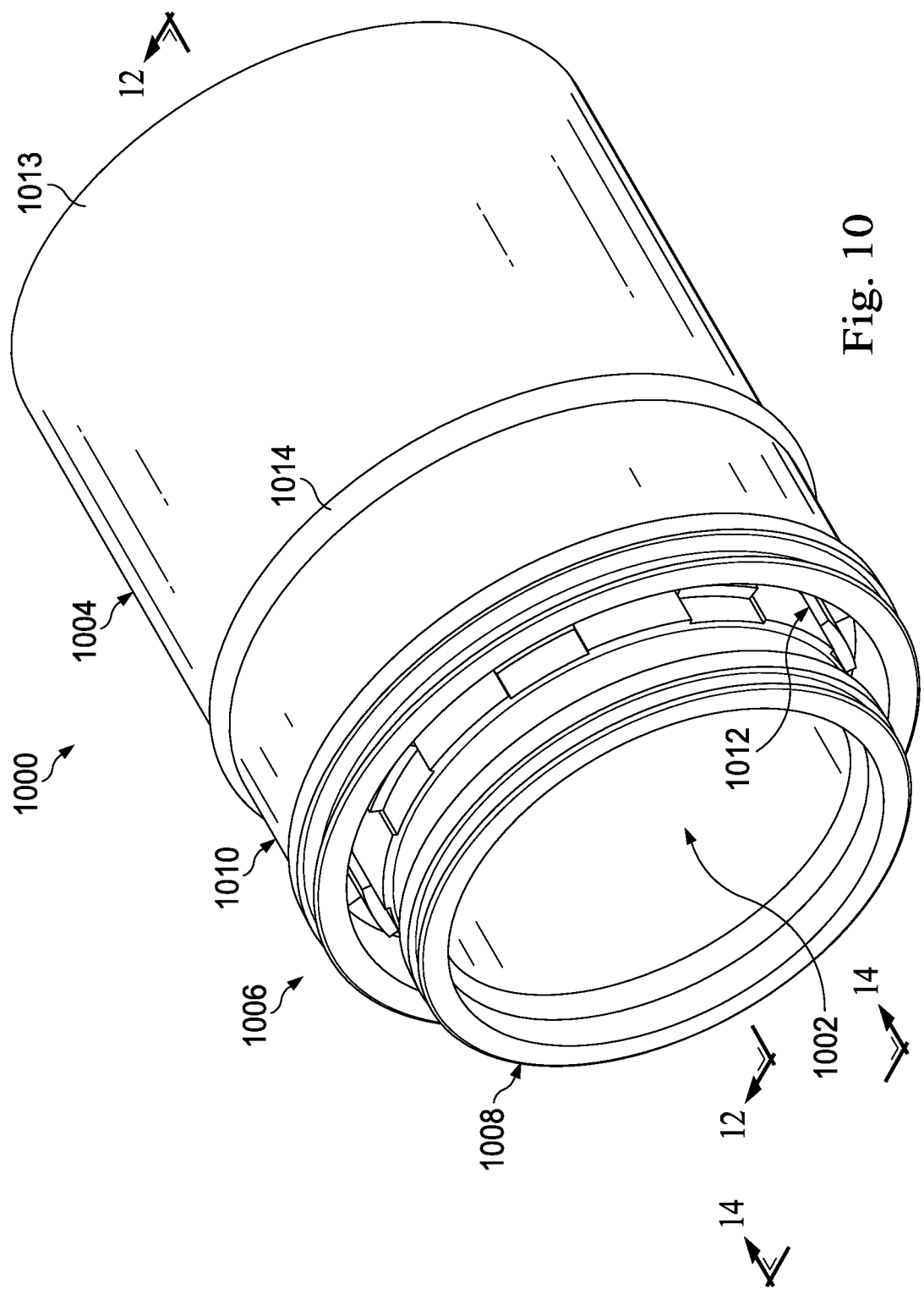
FIG. 10 is an illustration of an isometric view of a duct system formed using a ferrule coupling having a different configuration in accordance with an example embodiment.

FIG. 10 is an illustration of an isometric view of a duct system formed using a ferrule coupling having a different configuration in accordance with an example embodiment. Duct system 1000 may include at least two ducts and may include any number of ferrules, ferrule couplings, or combination thereof. In one illustrative embodiment, duct system 1000 includes inner duct 1002, outer duct 1004, and ferrule coupling 1006. Ferrule coupling 1006 is used to mechanically join inner duct 1002 and outer duct 1004. In these illustrative examples, ferrule coupling 1006 includes inner ferrule 1008, outer ferrule 1010, and intermediate ferrule 1012.

In some cases, the intermediate ferrule 1012 may also be referred to as an inner ferrule. For example, intermediate ferrule 1012 may be a first inner ferrule and inner ferrule 1008 may be a second inner ferrule. The first and second inner ferrules may be joined together to form a sub-coupling that is joined to outer ferrule 1010.

Inner ferrule 1008 is joined to inner duct 1002. Outer ferrule 1010 is joined to outer duct 1004. Inner ferrule 1008 and outer ferrule 1010 are joined through intermediate ferrule 1012. Accordingly, joining inner ferrule 1008 with outer ferrule 1010 through intermediate ferrule 1012 thereby joins inner duct 1002 with outer duct 1004. As depicted, when duct system 1000 is assembled, outer ferrule 1010 may at least partially overlap inner ferrule 1008. The joining of inner ferrule 1008 to inner duct 1002 and outer ferrule 1010 to outer duct 1004 may be performed using a mechanical technique, electrostatic bonding, adhesive bonding, some other technique, or a combination thereof.

In some illustrative examples, outer ferrule 1010 may be positioned adjacent to and in contact with an edge of outer duct 1004. In other illustrative examples, outer ferrule 1010 may be positioned around at least a portion of exterior 1013 of outer duct 1004. In one illustrative example, outer ferrule 1010 is welded to outer duct 1004 at weld interface 1014. Weld interface 1014 may be formed using, for example, a butt welding technique. In other illustrative examples, outer ferrule 1010 may be joined to outer duct 1004 in some other manner. In some cases, inner ferrule 1008 may be welded to inner duct 1002 in a similar manner.

In other illustrative examples, inner ferrule 1008 and outer ferrule 1010 may be joined to inner duct 1002 and outer duct 1004, respectively, through swaging (e.g., roller swaging, rotary swaging, axial swaging, or some other type of swaging) or some other joining technique. In some cases, adhesive may be used in joining inner ferrule 1008 and outer ferrule 1010 to inner duct 1002 and outer duct 1004, respectively.

Figure 11:
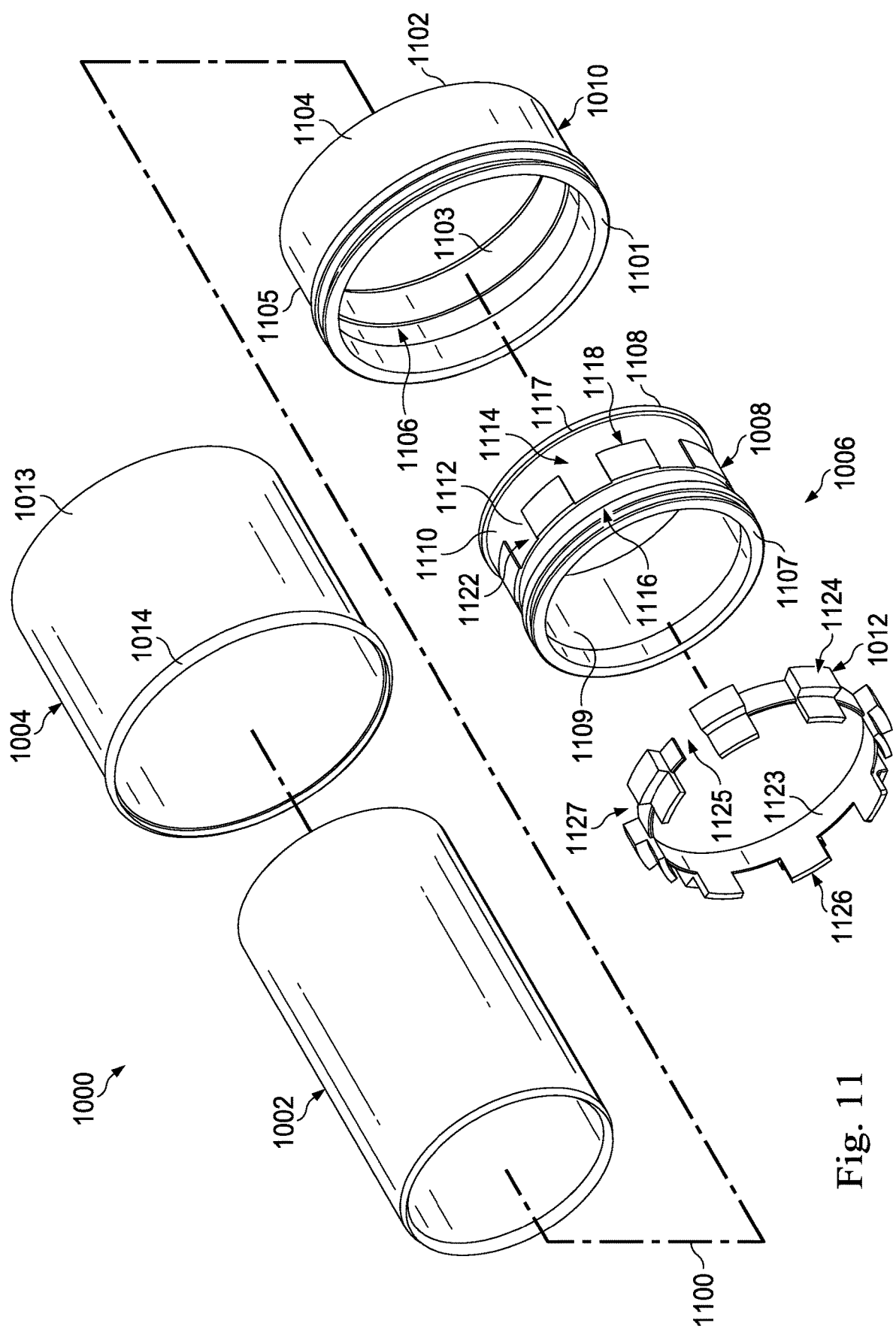
FIG. 11 is an illustration of an isometric exploded view of the duct system from FIG. 10 in accordance with an example embodiment.

FIG. 11 is an illustration of an isometric exploded view of duct system 1000 from FIG. 10 in accordance with an example embodiment. As depicted, inner duct 1002, outer duct 1004, inner ferrule 1008, outer ferrule 1010, and intermediate ferrule 1012 may be substantially cylindrical. Further, when duct system 1000 is assembled, inner duct 1002, outer duct 1004, inner ferrule 1008, outer ferrule 1010, and intermediate ferrule 1012 may be substantially coaxial with respect to axis 1100.

Outer ferrule 1010 extends between end 1101 and end 1102. As depicted, outer ferrule 1010 has inner surface 1103 and outer surface 1104. Outer ferrule 1010 includes body 1105 having engagement area 1106. Engagement area 1106 is formed along inner surface 1103 of body 1105 of outer ferrule 1010. Engagement area 1106 may be referred to as, in some cases, a retaining feature. In one illustrative example, engagement area 1106 may be shaped and sized to form a pocket or notch for positioning and retaining at least a portion of intermediate ferrule 1012. In one illustrative example, the engagement area 1106 includes a groove.

In this illustrative example, inner ferrule 1008 has end 1107 and end 1108. Further, inner ferrule 1008 has inner surface 1109 and outer surface 1110. Inner ferule 1008 includes body 1112 having engagement area 1114. Depending on the implementation, engagement area 1114 may be a single continuous engagement area or may be comprised of multiple engagement areas.

Inner ferrule 1008 also includes stop feature 1116 and stop feature 1117. Stop feature 1116 may be located at or near end 1108. Stop feature 1117 may be located at or near end 1107. In one illustrative example, stop feature 1117 is located near but spaced away from end 1107. Stop feature 1116 may be, for example, a lip or other type of protrusion at the edge of inner ferrule 1008 at end 1108.

In this illustrative example, engagement area 1114 is located between stop feature 1116 and stop feature 1117. Engagement area 1114 may be referred to, in some cases, as a retaining feature. Engagement area 1114 may be shaped and sized for receiving, positioning, and retaining at least a portion of intermediate ferrule 1012.

As depicted, inner ferrule 1008 may include plurality of protrusions 1118 that protrude outwards from body 1112 of inner ferrule 1008. Plurality of protrusions 1118 may be discrete, discontinuous protrusions disposed substantially circumferentially around inner ferrule 1008. In this illustrative example, plurality of protrusions 1118 is located adjacent to and extends axially away from stop feature 1117. Plurality of protrusions 1118 does not extend all the way to stop feature 1116.

Engagement area 1114 includes plurality of retaining areas 1122 (e.g., gaps) defined between plurality of protrusions 1118. In other illustrative examples, plurality of retaining areas 1122 may be considered separate from engagement area 1114.

When duct system 1000 is assembled, intermediate ferrule 1012 is positioned between inner ferrule 1008 and outer ferrule 1010. Intermediate ferrule 1012 helps join inner ferrule 1008 with outer ferrule 1010, while also providing a spacing or separation, in a radial direction relative to axis 1100, between inner ferrule 1008 and outer ferrule 1010.

Intermediate ferrule 1012 includes body 1123, plurality of engagement sections 1124, and plurality of tab elements 1126. In one illustrative example, body 1123 takes the form of a band or nearly annular band. For example, body 1123 includes gap 1125. Plurality of engagement sections 1124 are disposed along and protrude outwards from body 1123. Plurality of engagement sections 1124 may include discontinuous engagement sections that are separated by plurality of gaps 1127. Plurality of engagement sections 1124 may engage engagement area 1106 of outer ferrule 1010. For example, when engagement area 1106 includes a groove, plurality of engagement sections 1124 may be disposed within the groove when duct system 1000 is fully assembled. Further, when duct system 1000 is fully assembled, plurality of gaps 1127 between plurality of engagement sections 1124 form openings (or channels) through which fluid may flow.

Plurality of tab elements 1126 are positioned adjacent to plurality of engagement sections 1124 and extend axially relative to axis 1100 in one direction away from body 1123. In this illustrative example, plurality of tab elements 1126 includes a corresponding tab element for each of plurality of engagement sections 1124. In other illustrative examples, a tab element in plurality of tab elements 1126 may be sized such that the tab element is positioned adjacent to multiple engagement sections of plurality of engagement sections 1124.

When intermediate ferrule 1012 is joined to inner ferrule 1008, plurality of engagement sections 1124 and plurality of tab elements 1126 are positioned and retained within engagement area 1114. Specifically, plurality of tab elements 1126 are positioned and retained within plurality of retaining areas 1122. Accordingly, plurality of protrusions 1118 on inner ferrule 1008 may be shaped and sized to define plurality of retaining areas 1122 for receiving plurality of tab elements 1126. In other words, plurality of retaining areas 1122 may be complementary to plurality of tab elements 1126.

Once intermediate ferrule 1012 is joined with inner ferrule 1008, stop feature 1116 and stop feature 1117 may help prevent axial movement of intermediate ferrule 1012 relative to inner ferrule 1008 relative to axis 1100. Plurality of protrusions 1118 may help prevent rotation of intermediate ferrule 1012 relative to inner ferrule 1008 about axis 1100.

In these illustrative examples, inner ferrule 1008 and intermediate ferrule 1012 may be mechanically joined via, for example, an interference fit (or friction fit). Gap 1125 in body 1123 of intermediate ferrule 1012 provides a degree of flexibility to body 1123 that allows intermediate ferrule 1012 to be wrapped around and fit over inner ferrule 1008 with an interference fit. Gap 1125, which may also be referred to as a discontinuity, may allow intermediate ferrule 1012 to be deformed in a manner that allows intermediate ferrule 1012 to be fitted around inner ferrule 1008. Thus, gap 1125 allows intermediate ferrule 1012 to be more easily joined to inner ferrule 1008.

In one illustrative example, intermediate ferrule 1012, when no forces are exerted on or applied to intermediate ferrule 1012, may have an inner diameter that is smaller than the outer diameter of inner ferrule 1008. This difference in diameters may allow intermediate ferrule 1012 to be fitted around inner ferrule 1008 with an interference fit.

In these illustrative examples, each of plurality of tab elements 1126 may have a height selected such that plurality of tab elements 1126 are substantially flush with plurality of protrusions 1118 of inner ferrule 1008 when intermediate ferrule 1012 is joined to inner ferrule 1008. In other illustrative examples, one or more of plurality of tab elements 1126 may have a height greater than or lower than plurality of protrusions 1118.

When inner ferrule 1008 is joined with intermediate ferrule 1012, the two ferrules form a sub-coupling that may then be joined to outer ferrule 1010. In particular, when inner ferrule 1008 and intermediate ferrule 1012 are joined to form the sub-coupling, plurality of engagement sections 1124 may fit within and be retained within engagement area 1106 of outer ferrule 1010.

In these illustrative examples, inner duct 1002, outer duct 1004, inner ferrule 1008, intermediate ferrule 1012, and outer ferrule 1010 may each be comprised of one or more materials including, but not limited to, metal and metal alloys. As one illustrative example, each of inner duct 1002, outer duct 1004, inner ferrule 1008, intermediate ferrule 1012, and outer ferrule 1010 may be comprised of a same or different aluminum alloy.

In these illustrative examples, plurality of engagement sections 1124 of intermediate ferrule 1012 may be comprised of a material that provides both sufficient compliancy and strength. In particular, plurality of engagement sections 1124 may need to be sufficiently compliant such that the sub-coupling of inner ferrule 1008 and intermediate ferrule 1012 may be inserted through outer ferrule 1010 and plurality of engagement sections 1124 may be slid into and fit within engagement area 1106 of outer ferrule 1010. Plurality of engagement sections 1124, however, may also need to be sufficiently strong and hard to allow each of plurality of engagement sections 1124 to retain its shape to maintain adequate separation between inner ferrule 1008 and outer ferrule 1010 over time.

Intermediate ferrule 1012 is used as a structural and mechanical separator between inner ferrule 1008 and outer ferrule 1010. Intermediate ferrule 1012 may be joined to inner ferrule 1008 after the welding operation has been performed to weld inner ferrule 1008 with inner duct 1002. Further, the sub-coupling formed by intermediate ferrule 1012 and inner ferrule 1008 may be joined with outer ferrule 1010 after the welding operation has been performed to weld outer ferrule 1010 to outer duct 1004. In this manner, intermediate ferrule 1012 may be used after a buildup of heat from the welding operations has dissipated and the weld interfaces between inner ferrule 1008 with inner duct 1002 and outer ferrule 1010 to outer duct 1004 has cooled. Engagement area 1114 of inner ferrule 1008 and engagement area 1106 of outer ferrule 1010 work together to retain intermediate ferrule 1012 as part of ferrule coupling 1006 and within duct system 1000.

Figure 12:
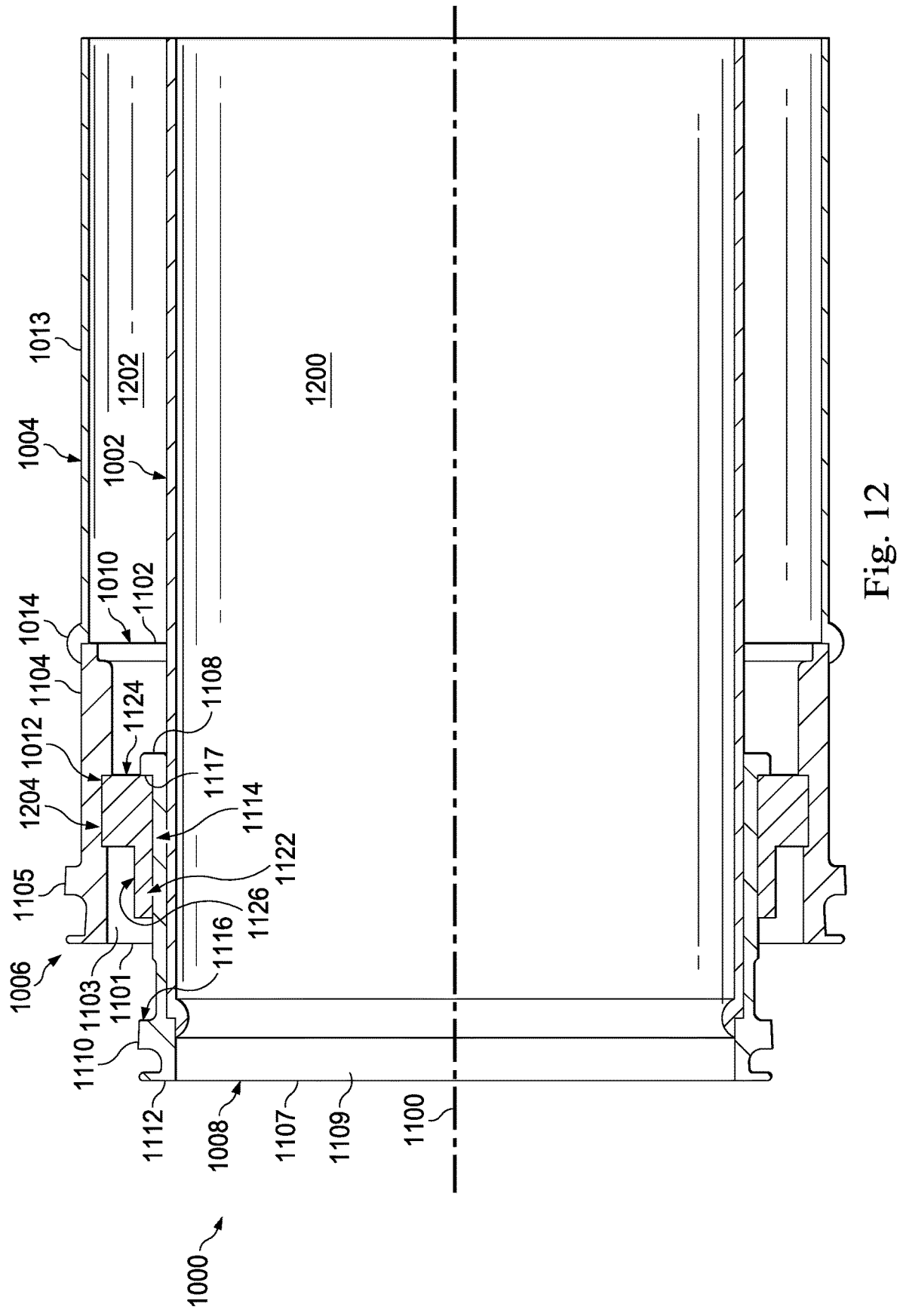
FIG. 12 is an illustration of a cross-sectional view of the duct system from FIG. 10 in accordance with an example embodiment.

FIG. 12 is an illustration of a cross-sectional view of duct system 1000 taken with respect to lines 12-12 in FIG. 10 in accordance with an example embodiment. As depicted, inner ferrule 1008 is joined with intermediate ferrule 1012 and outer ferrule 1010. A fluid (e.g., a liquid(s), a gas(es), or combination thereof) may flow through channel 1200 through inner duct 1002.

In this illustrative example, inner duct 1002 has been joined within inner ferrule 1008 through an interference fit. Intermediate ferrule 1012 has been joined with inner ferrule 1008 through an interference fit. As depicted, each of plurality of engagement sections 1124 fits within and is retained within engagement area 1106 of outer ferrule 1010.

Ferrule coupling 1006 formed by inner ferrule 1008, outer ferrule 1010, and intermediate ferrule 1012 provides separation between inner duct 1002 and outer duct 1004. In particular, ferrule coupling 1006 spaces apart outer duct 1004 from inner duct 1002 to define region 1202 between inner duct 1002 and outer duct 1004. Outer duct 1004 may be separated from inner duct 1002 in a radial direction relative to axis 300. Region 1202 may be used to collect any leakage of fluid flowing through channel 1200 within inner duct 1002. For example, outer duct 1004 may function as a "shroud" that prevents any leakage of fluid out of inner duct 1002 from escaping duct system 1000. In other illustrative examples, region 1202 may provide for the flow of a fluid different from the fluid flowing through channel 1200 in a same or different direction.

In still other illustrative examples, channel 1200 may be used for transferring fluid and filling, while region 1202 may be used for venting. As one illustrative example, when duct system 1000 is used within, for example, refueling boom 120 of FIG. 1, region 1202 may be used to provide venting. When fuel is transferred through refueling boom 120 into, for example, a fuel tank of another aircraft, vapors in the fuel tank may be pushed out as fuel fills the fuel tank. These vapors may be vented out of the fuel tank through region 1202 between inner duct 1002 and outer duct 1004.

The engagement of threads on plurality of engagement sections 1124 with engagement area 1106 establishes ferrule interface 1204 between inner ferrule 1008, intermediate ferrule 1012, and outer ferrule 1010. Ferrule interface 1204 establishes an electrostatic bond between the three ferrules and thereby, between inner duct 1002 and outer duct 1004. Ferrule interface 1204 may be stronger and more resistant to temperature-based stresses, cracking, and/or other inconsistencies as compared to an interface formed by welding. Further, ferrule interface 1204, even if reworked later in the life of duct system 1000, may be capable of maintaining the electrostatic bond between inner ferrule 1008, intermediate ferrule 1012, and outer ferrule 1010 and thereby, between inner duct 1002 and outer duct 1004.

FIG. 13 is an illustration of a side exploded view of duct system 1000 from FIG. 12 in accordance with an example embodiment. As depicted, outer ferrule 1010 includes stop feature 1300 that helps define engagement area 1106. Stop feature 1300 also helps provide a guide for the positioning of the sub-coupling formed by inner ferrule 1008 and intermediate ferrule 1012 of FIGS. 10-12 within outer ferrule 1010. When this sub-coupling is fit within outer ferrule 1010, stop feature 1300 prevents the sub-coupling from moving further in the direction of arrow 1302.

Figure 14:
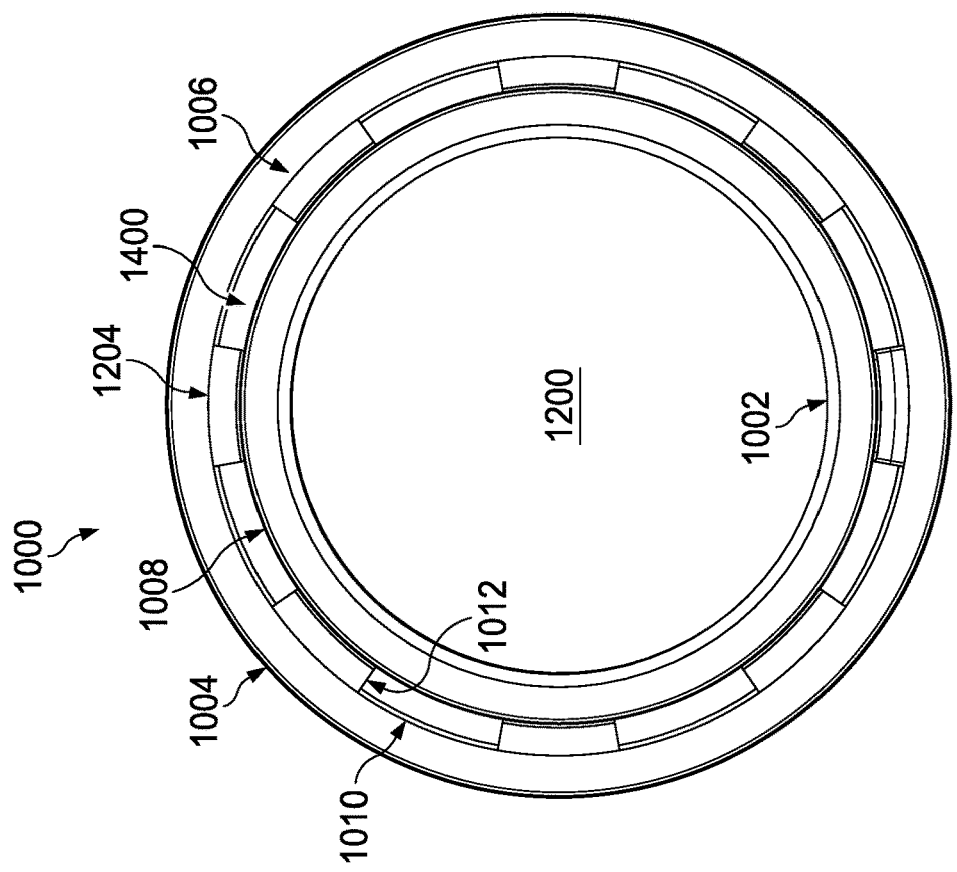
FIG. 14 is an illustration of a front view of the duct system from FIG. 10 in accordance with an illustrative embodiment.

FIG. 14 is an illustration of a front view of duct system 1000 taken with respect to lines 14-14 in FIG. 10 in accordance with an illustrative embodiment. As depicted, plurality of gaps 1127 between plurality of engagement sections 1124 of intermediate ferrule 1012 help define plurality of openings 1400 through which fluid may flow. Plurality of openings 1400 allow fluid to flow into or out of region 1202. For example, plurality of openings 1400 may allow fluid to flow in a substantially axial direction relative to axis 1100.

Figure 15:
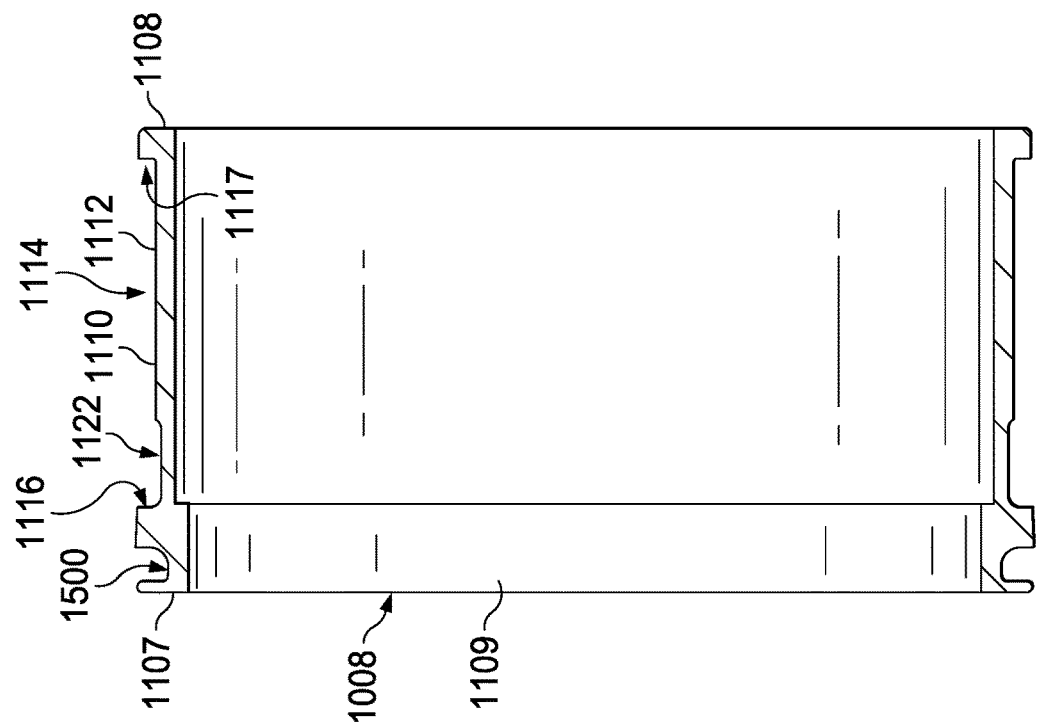
FIG. 15 is an illustration of a cross-sectional view of an inner ferrule in accordance with an example embodiment.

FIG. 15 is an illustration of a cross-sectional view, similar to that of FIG. 13, of only inner ferrule 1008 in accordance with an example embodiment. As depicted, inner ferrule 1008 also includes outer groove 1500. Outer groove 1500 may be used during the manufacturing of inner ferrule 1008 (e.g., as a data point reference), may receive a sealing component, such as an O-ring, may be interfaced with one or more other components (e.g., may be used to join inner ferrule 1008 to a different ferrule), or a combination thereof.

Figure 16:
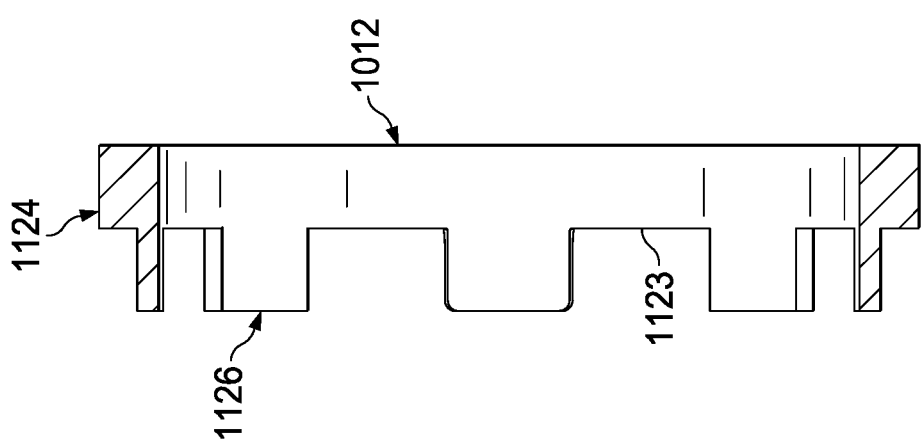
FIG. 16 is an illustration of a cross-sectional view of an intermediate ferrule in accordance with an example embodiment.

FIG. 16 is an illustration of a cross-sectional view, similar to that of FIG. 13, of only intermediate ferrule 1012 in accordance with an example embodiment.

Figure 17:
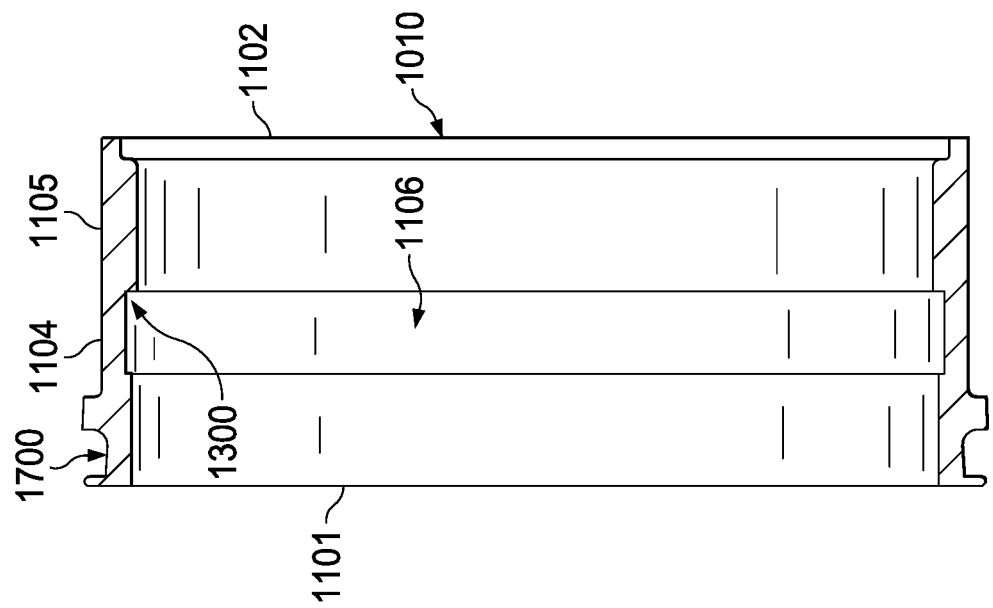
FIG. 17 is an illustration of a cross-sectional view of an outer ferrule in accordance with an example embodiment.

FIG. 17 is an illustration of a cross-sectional view, similar to that of FIG. 13, of only outer ferrule 1010 in accordance with an example embodiment. As depicted, outer ferrule 1010 includes outer groove 1700. Outer groove 1700 may be used during the manufacturing of outer ferrule 1010 (e.g., as a data point reference), may receive a sealing component, such as an O-ring, may be interfaced with one or more other components (e.g., may be used to join outer ferrule 1010 to a different ferrule), or a combination thereof.

While the illustrative examples described herein include continuous engagement areas and discontinuous engagement sections disposed on certain portions of the ferrules, other example embodiments include engagement areas or engagement sections disposed on other portions of the ferrules. In other illustrative examples, an engagement area described herein may be substituted with engagement sections, and engagement sections may be substituted with an engagement area. Corresponding engagement areas and engagement sections may be mechanically joined to each other. For example, corresponding engagement areas and engagement sections may be mechanically joined through interference fit, swaging, bolting, adhesive bonding, some other technique, or a combination thereof.

FIG. 18 is a flowchart illustration of a process for assembling a duct system in accordance with an example embodiment. Process 1800 illustrated in FIG. 18 may be implemented using duct system 200 from FIGS. 2-9.

Process 1800 begins by joining outer duct 204 to outer ferrule 210 (step 1802). In one illustrative example, outer duct 204 may be welded to outer ferrule 210. Next, plurality of engagement sections 306 of inner ferrule 208 may be mechanically joined to engagement area 322 of outer ferrule 210 (step 1804).

At step 1804, mechanically joining plurality of engagement sections 306 with engagement area 322 joins inner ferrule 208 to outer ferrule 210, such that outer ferrule 210 is at least partially disposed around inner ferrule 208. In some illustrative examples, thread locker or some type of sealant or adhesive may be applied to one or more of plurality of engagement sections 306 or engagement area 322 to aid in securing inner ferrule 208 and outer ferrule 210 together. In these illustrative examples, each of plurality of engagement sections 306 may then be threaded together with engagement area 322. The threads on plurality of engagement sections 306 may be torqued to a predetermined torque value to provide adequate electrostatic bonding contact between inner ferrule 208 and outer ferrule 210, and thereby inner duct 202 and outer duct 204.

Inner duct 202 is joined to inner ferrule 208 (step 1806), with the process terminating thereafter. In one illustrative example, inner duct 202 may be swaged (e.g., roller swaged) to grooves 310 disposed on inner surface 303 of inner ferrule 208. In one or more examples, this swaging may be performed according to the Aerospace Standard set by the Society of Automotive Engineers (SAE) (e.g., SAE AS4060).

FIG. 19 is a flowchart illustration of a process for assembling a duct system in accordance with an example embodiment. Process 1900 illustrated in FIG. 19 may be implemented using duct system 1000 from FIGS. 10-17.

Process 1900 may begin by joining outer duct 1004 to outer ferrule 1010 and inner duct 1002 to inner ferrule 1008 (step 1902). In one illustrative example, outer duct 1004 may be welded to outer ferrule 1010 and inner duct 1002 may be welded to inner ferrule 1008. In other illustrative examples, some other type of process may be used to perform the joining of these components. For example, in some cases, inner duct 1002 may be swaged within inner ferrule 1008.

Thereafter, intermediate ferrule 1012 is joined to inner ferrule 1008 to form a sub-coupling (step 1904). This sub-coupling may also be referred to as a ferrule sub-coupling. The sub-coupling is then joined to outer ferrule 1010 (step 1906), with the process terminating thereafter. The joining of the sub-coupling to outer ferrule 1010 joins inner ferrule 1008 to outer ferrule 1010, and thereby, inner duct 1002 to outer duct 1004. In some illustrative examples, the joining performed at step 1604 and 1606 may be performed through interference fits. During these joining processes, the various stop features of inner ferrule 1008 and outer ferrule 1010 may be used to help guide and align the different ferrules relative to each other. In some illustrative examples, sealant or adhesive may be used to provide additional support and restraint.

FIG. 20 is a flowchart illustration of a process for moving fuel through a duct system in an aircraft in accordance with an example embodiment. Process 2000 illustrated in FIG. 20 may be implemented using, for example, duct system 200 from FIGS. 2-9.

Process 2000 may begin by moving the fuel through inner duct 202 that is joined with outer duct 204 through a joining of inner ferrule 208 attached to inner duct 202 and outer ferrule 210 attached to outer duct 204 (step 2002). At step 2002, inner duct 202 and outer duct 204 may at least partially form a fuel line or portion of a fuel line system for an aircraft, such as aircraft 100 in FIG. 1. In some embodiments, the aircraft may be a refueling aircraft, such as a tanker aircraft.

A leakage from the fuel flowing through inner duct 202 is captured within region 402 that is formed between inner duct 202 and outer duct 204 by plurality of engagement sections 306 of inner ferrule 208 that protrude radially outward from inner ferrule 208 and that define a plurality of gaps 308 between plurality of engagement sections 306 (step 2004), with the process terminating thereafter. At step 2004, the leakage may be a leakage of the fuel itself or a leakage of vapors. The leakage of fuel or vapors that is captured, or collected, within region 402 may be allowed to flow through plurality of gaps 308 between plurality of engagement sections 306.

Thus, the different example embodiments provide two different configurations of ferrule couplings that may be used to join two lines, such as ducts, together. In one example embodiment, a ferrule coupling comprises an inner ferrule and an outer ferrule. The inner ferrule has a plurality of engagement sections. The outer ferrule has an engagement area that allows for the outer ferrule to be disposed around at least a portion of the inner ferrule and mechanically join the engagement area to the plurality of engagement sections to join the inner ferrule to the outer ferrule.

In another example, another apparatus is provided. The apparatus comprises an inner ferrule, an intermediate ferrule, and an outer ferrule. The intermediate ferrule includes a plurality of engagement sections and is disposed around at least a portion of the inner ferrule and mechanically joined to the inner ferrule. The outer ferrule includes an engagement area and is disposed around at least a portion of the intermediate ferrule. The engagement area and the plurality of engagement sections are mechanically joined to the plurality of engagement sections.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. For example, while the processes described herein detail a manufacturing process with a certain sequence of assembly, other processes may include different sequences for the steps of the process, as needed.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required. For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and five of item C; three of item B and six of item C; or some other suitable combination.

The description of the different illustrative examples has been presented for purposes of illustration and description, and is not intended to be exhaustive or limited to the embodiments in the form disclosed. Many modifications and variations will be apparent to those of ordinary skill in the art. Further, different illustrative examples may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
an inner ferrule comprising a plurality of engagement sections that define a plurality of gaps between the plurality of engagement sections, wherein the plurality of engagement sections has first threads;
an inner duct;
an outer ferrule disposed around at least a portion of the inner ferrule and comprising an engagement area, wherein the engagement area comprises second threads corresponding to and threaded together with the first threads of the plurality of engagement sections to join the inner ferrule to the outer ferrule; and
an outer duct disposed around at least a portion of the inner duct and joined to the outer ferrule.

2. The apparatus of claim 1, wherein each of the plurality of engagement sections has threads that form the first threads, and wherein the plurality of engagement sections and the engagement area are threaded together using the threads of each of the plurality of engagement sections and the second threads of the engagement area.

3. The apparatus of claim 1, wherein at least one of the inner ferrule or the inner duct define an outer circumference of a first fluid volume.

4. The apparatus of claim 1, wherein at least one of the outer ferrule or the outer duct define an outer circumference of a second fluid volume.

5. The apparatus of claim 1, wherein the inner ferrule comprises:
a swage groove, wherein the inner duct is joined to the inner ferrule by swaging a portion of the inner duct into the swage groove.

6. The apparatus of claim 1, wherein the outer duct is joined to the outer ferrule by welding.

7. The apparatus of claim 1, wherein the inner ferrule, the outer ferrule, the inner duct, and the outer duct are substantially cylindrical, the outer ferrule is disposed circumferentially around the inner ferrule, and the outer duct is disposed circumferentially around the inner duct.

8. The apparatus of claim 1, wherein the inner ferrule is a first inner ferrule and further comprising:
a second inner ferrule joined to the first inner ferrule, wherein the first inner ferrule is disposed around at least a portion of the second inner ferrule.

9. The apparatus of claim 1,
wherein the plurality of engagement sections protrude from the inner ferrule such that a region is formed between the inner duct and the outer duct.

10. The apparatus of claim 9, wherein a leakage of vapors is collected within the region between the inner duct and the outer duct when fuel is transferred through the inner duct.

11. The apparatus of claim 10, wherein the vapors move through the plurality of gaps between the plurality of engagement sections.

12. An apparatus comprising:
an inner ferrule comprising a plurality of retaining areas;
an intermediate ferrule comprising a plurality of tab elements and a plurality of engagement sections,
wherein the plurality of tab elements is retained within the plurality of retaining areas such that the intermediate ferrules is mechanically joined to the inner ferrule and such that the intermediate ferrule is disposed around at least a portion of the inner ferrule; and
an outer ferrule comprising an engagement area mechanically joined to the plurality of engagement sections such that the outer ferrule is disposed around at least a portion of the intermediate ferrule.

13. The apparatus of claim 12, wherein the engagement area comprises a groove and the plurality of engagement sections and the engagement area are joined via an interference fit with the plurality of engagement sections disposed within the groove.

14. The apparatus of claim 12, wherein the inner ferrule comprises a plurality of protrusions and wherein the plurality of retaining areas is formed between the plurality of protrusions, and wherein the inner ferrule is mechanically joined to the intermediate ferrule via an interference fit with the plurality of tab elements disposed within the plurality of retaining areas.

15. The apparatus of claim 14, wherein each of the plurality of tab elements has a height selected such that the plurality of tab elements is substantially flush with the plurality of protrusions of the inner ferrule when the intermediate ferrule is joined with the inner ferrule.

16. The apparatus of claim 12, further comprising:
an inner duct joined to the inner ferrule; and
an outer duct joined to the outer ferrule.

17. A method comprising:
joining an outer duct to an outer ferrule;
joining, mechanically, a first inner ferrule comprising a plurality of engagement sections with a second inner ferrule via an interference fit such that the plurality of engagement sections is disposed around at least a portion of the second inner ferrule and such that a plurality of tab elements of the first inner ferrule is disposed within a plurality of retaining areas of the second inner ferrule; and
joining the first inner ferrule to an engagement area of the outer ferrule such that the outer ferrule is disposed around at least a portion of the first inner ferrule.

18. The method of claim 17, further comprising:
joining the second inner ferrule to an inner duct.

19. The method of claim 18, wherein joining the second inner ferrule to the inner duct comprises:
swaging the inner duct into grooves of the second inner ferrule.

20. The method of claim 18, further comprising:
capturing vapors within a region formed between the inner duct and the outer duct; and
allowing the vapors to flow through a plurality of gaps formed between the plurality of engagement sections.

21. A method comprising:
joining an outer duct to an outer ferrule;
joining, mechanically, an inner ferrule, which comprises a plurality of engagement sections that define a plurality of gaps between the plurality of engagement sections, to an engagement area of the outer ferrule by engaging the plurality of engagement sections of the inner ferrule having first threads with second threads of the engagement area that correspond to the first threads such that the outer ferrule is disposed around at least a portion of the inner ferrule; and
joining the inner ferrule, which is joined with the outer ferrule, to an inner duct such that the inner duct is joined with the outer duct attached to the outer ferrule and the outer duct is disposed around at least a portion of the inner duct.

22. The method of claim 21, wherein joining the outer duct to the outer ferrule comprises:
welding the outer duct to the outer ferrule.

23. The method of claim 21, wherein joining the inner ferrule to the inner duct comprises:
swaging the inner duct into grooves of the inner ferrule.

24. The method of claim 21, further comprising:
moving fuel through the inner duct; and
capturing a leakage from the fuel flowing through the inner duct within a region that is formed between the inner duct and the outer duct by the plurality of engagement sections of the inner ferrule that protrude radially outward from the inner ferrule and that define the plurality of gaps between the plurality of engagement sections.

25. The method of claim 21, wherein the inner ferrule, the outer ferrule, the inner duct, and the outer duct are substantially cylindrical such that when the inner ferrule is joined to the outer ferrule, the outer ferrule is disposed circumferentially around the inner ferrule, and the outer duct is disposed circumferentially around the inner duct.

* * * * *